(12) United States Patent
Takanashi et al.

(10) Patent No.: US 10,671,771 B2
(45) Date of Patent: Jun. 2, 2020

(54) CABLE WIRING PROGRAM, CABLE WIRING METHOD, AND INFORMATION PROCESSING APPARATUS

(71) Applicant: FUJITSU LIMITED, Kawasaki-shi, Kanagawa (JP)

(72) Inventors: Masahiro Takanashi, Yokohama (JP); Ken Tsushima, Shizuoka (JP)

(73) Assignee: FUJITSU LIMITED, Kawasaki (JP)

( * ) Notice: Subject to any disclaimer, the term of this patent is extended or adjusted under 35 U.S.C. 154(b) by 495 days.

(21) Appl. No.: 15/208,122

(22) Filed: Jul. 12, 2016

(65) Prior Publication Data

US 2017/0024499 A1   Jan. 26, 2017

(30) Foreign Application Priority Data

Jul. 21, 2015   (JP) ................................ 2015-144436

(51) Int. Cl.
*G06F 30/20* (2020.01)
*G06F 30/394* (2020.01)
*G06F 113/16* (2020.01)

(52) U.S. Cl.
CPC ............ *G06F 30/20* (2020.01); *G06F 30/394* (2020.01); *G06F 2113/16* (2020.01)

(58) Field of Classification Search
CPC ............. G06F 17/5009; G06F 17/5077; G06F 2217/36
USPC .......................................................... 703/13
See application file for complete search history.

(56) References Cited

U.S. PATENT DOCUMENTS

| 7,201,279 B1* | 4/2007 | Mimlitch, III ....... A47B 96/025 211/175 |
| 2004/0120133 A1* | 6/2004 | Nguyen ............... H05K 7/1491 361/825 |
| 2007/0038415 A1 | 2/2007 | Okada et al. |

FOREIGN PATENT DOCUMENTS

| JP | 2007-52495 | 3/2007 |
| JP | 2009-176616 | * 8/2009 |

* cited by examiner

*Primary Examiner* — Brian S Cook
(74) *Attorney, Agent, or Firm* — Staas & Halsey LLP

(57) ABSTRACT

A cable wiring method, wherein a route of a cable that connects a first connector of a first product and a second connector of a second product that are provided in an area surrounded by a plurality of columns, the method comprises; generating a provisional point at an intersection between a cable route along one of the columns and a plane that includes a coordinate of the first connector and is parallel to a plane of axes in depth and lateral directions; generating a first point at any position between a position away from the provisional point by the length of a certain bend radius of the cable in the lateral direction and a position determined by a coordinate of the axis in the lateral direction of the first connector.

12 Claims, 23 Drawing Sheets

FIG. 2

| | SPECIFICATION VALUE | |
|---|---|---|
| CABLE TYPE | POWER SOURCE CABLE | |
| CABLE USED | ATTACHED CABLE | |
| VOLTAGE | 100 V | |
| CABLE LENGTH | 1.50 m | |
| DESIRED CONNECTION LENGTH | 1.42 m | |
| DESIRED PULL-OUT LENGTH | 2.34 m | |
| STATE | PULL-OUT IS NOT ALLOWED/CONNECTION IS ALLOWED | |
| WIRING TO BE FIXED | OFF | |

CLOSE

DISCONNECTED
DISCONNECTED
DISCONNECTED
DISCONNECTED
DISCONNECTED

☒ SPECIFICATION VALUE

FIG. 5

| ITEM | CONTENT |
|---|---|
| CONNECTOR NAME | IDENTIFICATION NAME OF CONNECTOR |
| x COORDINATE (DEPTH) | x COORDINATE FROM PRODUCT ORIGIN (RELATIVE COORDINATE ORIGIN) |
| y COORDINATE (WIDTH) | y COORDINATE FROM PRODUCT ORIGIN (RELATIVE COORDINATE ORIGIN) |
| z COORDINATE (HEIGHT) | z COORDINATE FROM PRODUCT ORIGIN (RELATIVE COORDINATE ORIGIN) |
| VECTOR | DIRECTION OF CABLE (HARNESS) |
| CABLE BUS 1 | CABLE ROUTE (LEFT OR RIGHT) IN z DIRECTION ON RACK SIDE |
| CABLE BUS 2 (CMA) | CABLE ROUTE (LEFT OR RIGHT) IN z DIRECTION ON RACK SIDE WHEN THERE IS OPTIONAL CMA |
| CONNECTION PRIORITY ORDER | CONNECTION ORDER WHEN THERE IS PLURALITY OF CONNECTORS OF PRODUCT |

FIG. 6

| ITEM | CONTENT |
|---|---|
| CONNECTOR NAME | IDENTIFICATION NAME OF CONNECTOR |
| x COORDINATE (DEPTH) | x COORDINATE FROM PRODUCT ORIGIN (RELATIVE COORDINATE ORIGIN) |
| y COORDINATE (WIDTH) | y COORDINATE FROM PRODUCT ORIGIN (RELATIVE COORDINATE ORIGIN) |
| z COORDINATE (HEIGHT) | z COORDINATE FROM PRODUCT ORIGIN (RELATIVE COORDINATE ORIGIN) |
| VECTOR | DIRECTION OF CABLE (HARNESS) |
| CONNECTION PRIORITY ORDER | CONNECTION ORDER WHEN THERE IS PLURALITY OF CONNECTORS OF PRODUCT |

| ITEM | CONTENT |
|---|---|
| RELAY POINT x COORDINATE | x COORDINATE OF RELAY POINT SET TO CMA |
| RELAY POINT y COORDINATE | y COORDINATE OF RELAY POINT SET TO CMA |
| RELAY POINT z COORDINATE | z COORDINATE OF RELAY POINT SET TO CMA |
| RELAY POINT VECTOR DIRECTION | DIRECTION OF CABLE (HARNESS) TO PASS THROUGH CMA |
| RELAY POINT CONNECTION ORDER DESIGNATION | CONNECTION ORDER OF RELAY POINTS (LAST NUMBER OF CONNECTION ORDER CORRESPONDS TO FINAL PASS POINT) |

413

| x COORDINATE | y COORDINATE | z COORDINATE | VECTOR DIRECTION | CONNECTION ORDER DESIGNATION | |
|---|---|---|---|---|---|
| -55.0 | 50.0 | 22.5 | 0, -1, 0 | 1 | 800-1 |
| -120.0 | 50.0 | 22.5 | 0, 1, 0 | 2 | 800-2 |
| -95.0 | 385.0 | 22.5 | 0, 1, 0 | 3 | 800-3 |
| -150.0 | 405.0 | 22.5 | -1, 0, 0 | 4 | 800-4 |
| -205.0 | 385.0 | 22.5 | 0, -1, 0 | 5 | 800-5 |
| -180.0 | 300.0 | 22.5 | 0, -1, 0 | 6 | 800-6 |
| -180.0 | 50.0 | 22.5 | 0, -1, 0 | 7 | 800-7 |

| ITEM | CONTENT |
|---|---|
| x COORDINATE (DEPTH) | x COORDINATE FROM RACK ORIGIN (ABSOLUTE COORDINATE ORIGIN) |
| y COORDINATE (WIDTH) | y COORDINATE FROM RACK ORIGIN (ABSOLUTE COORDINATE ORIGIN) |
| z COORDINATE (HEIGHT) | z COORDINATE CHANGES DEPENDING ON POSITION OF MOUNTED PRODUCT AND DISCRETIONALLY-SET RELAY POINT ON PRODUCT SIDE<br>· z COORDINATE OF FINAL RELAY POINT OF PRODUCT RELAY POINT WHEN THERE IS PRODUCT RELAY POINT<br>· z COORDINATE OF FINAL RELAY POINT OF CMA WHEN THERE IS CMA<br>· z COORDINATE FOR CONNECTOR OF PRODUCT WHEN NEITHER PRODUCT RELAY POINT NOR CMA FINAL RELAY POINT EXISTS |
| VECTOR | DIRECTION OF CABLE (HARNESS) |

⇩

414

| x COORDINATE | y COORDINATE | z COORDINATE | VECTOR DIRECTION |
|---|---|---|---|
| 100.0 | 650.0 | CHANGES DEPENDING ON PRODUCT MOUNT POSITIONAL RELATIONSHIP | CHANGES DEPENDING ON PRODUCT MOUNT POSITIONAL RELATIONSHIP |
| 100.0 | 50.0 | | |

FIG. 10

| PLUG SHAPE | WIRE DIAMETER (mm) | RISING DISTANCE (mm) | MINIMUM BEND RADIUS (mm) | |
|---|---|---|---|---|
| NEMA 5-15P | 8.5 | 45 | 40 | ~ 1000-1 |
| PARALLEL 2P WITH GROUND | | | | ~ 1000-2 |
| NEMA L5-30P | 15 | 79 | 80 | ~ 1000-3 |
| NEMA L6-15P | 8.5 | 80 | 40 | ~ 1000-4 |
| NEMA L6-20P | 11 | 53 | 60 | ~ 1000-5 |
| NEMA L6-30P | 15 | 79 | 80 | ~ 1000-6 |
| IEC320-C14 | 8.5 | 54 | 40 | ~ 1000-7 |
| IEC60320-C14 | | | | ~ 1000-8 |
| IEC320-C20 | 10 | 70 | 60 | ~ 1000-9 |
| IEC60320-C20 | | | | ~ 1000-10 |

FIG. 19
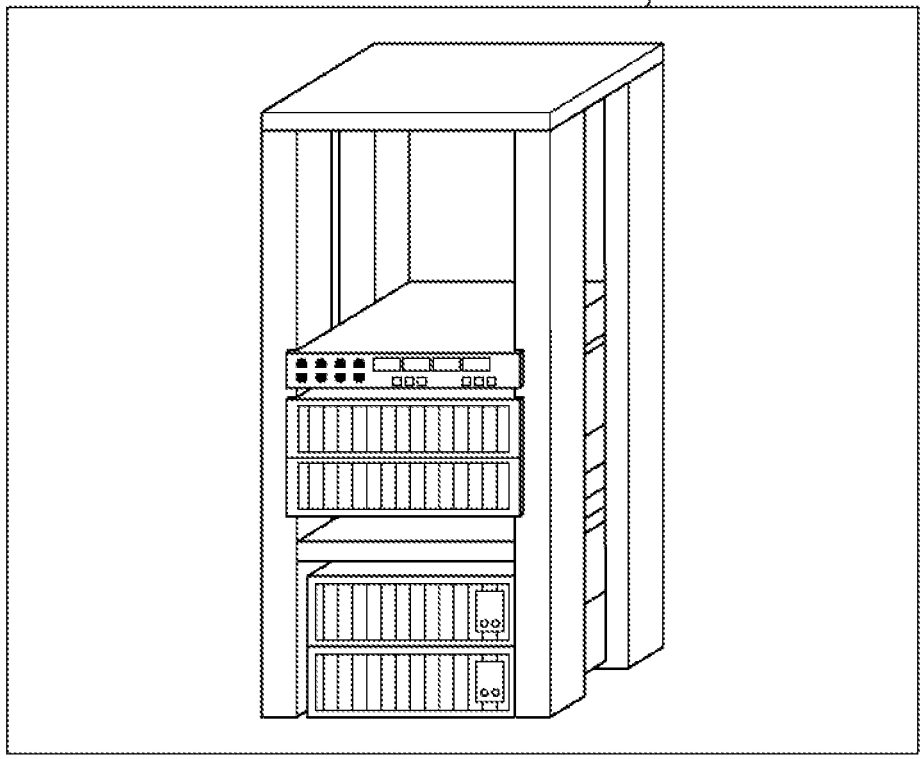
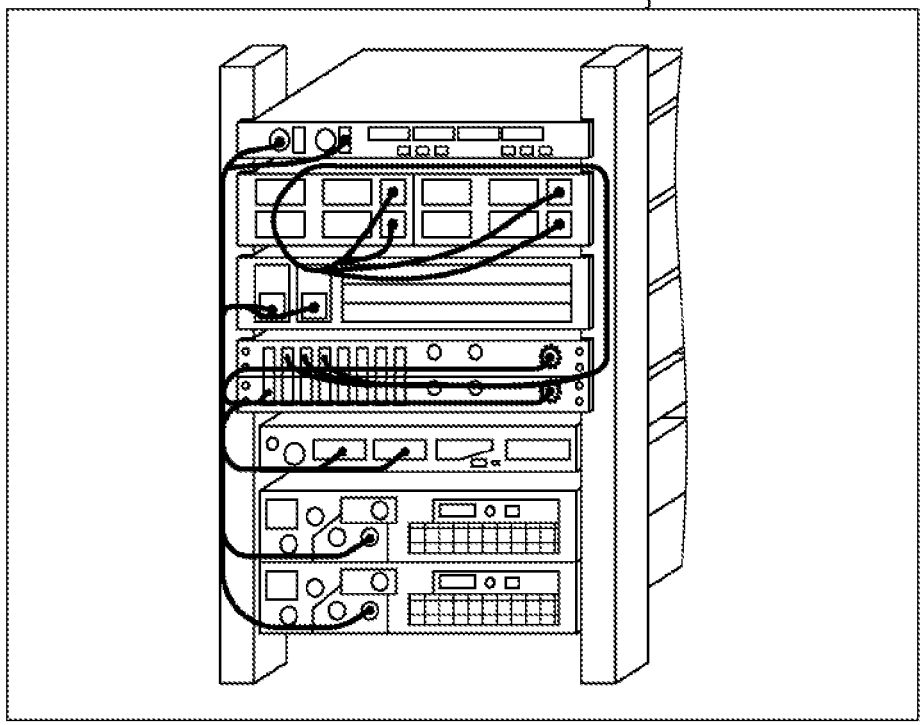

US 10,671,771 B2

CABLE WIRING PROGRAM, CABLE WIRING METHOD, AND INFORMATION PROCESSING APPARATUS

CROSS-REFERENCE TO RELATED APPLICATION

This application is based upon and claims the benefit of priority of the prior Japanese Patent Application No. 2015-144436, filed on Jul. 21, 2015, the entire contents of which are incorporated herein by reference.

FIELD

The embodiments discussed herein are related to a cable wiring program, a cable wiring method, and an information processing apparatus.

BACKGROUND

In a related art, when servers are mounted on a rack, connectors of the servers are connected to each other through a cable the length of which has been determined to be 3 [m] or the like in advance. Recently, the length or the like of a cable is allowed to be specified by a user, for example, so that the user selects a cable and the length of the cable. In the related art, for example, the user determines the length of a cable by using, as an index, a distance between products such as servers provided on a rack that has been simulated in a two-dimensional simulation space. In addition, when a rack is simulated in a three-dimensional simulation space, the user manually creates a route of a cable by using a computer aided design (CAD).

In addition, in the related art, for example, there is a known technology by which an optimal route of a cable laid on a chemical plant or a power plant where a lot of objects are placed is designed to calculate the cable length (for example, see Japanese Laid-open Patent Publication No. 2007-52495). As the power plant, for example, there are a thermal power plant, a nuclear power plant, a hydroelectric power plant, and the like.

In addition, in the related art, for example, there is a known technology by which, when designing a harness of a printed circuit board or the like, a harness wiring route and the length of the route between two end points are automatically calculated so that a location that is not allowed to be set as the harness wiring route is avoided (for example, see Japanese Laid-open Patent Publication No. 2009-176616).

However, when the user creates a route of a cable from an input connector to an output connector in a three-dimensional simulation space using a CAD manually, it takes effort and time for the creation work depending on the experience and the proficiency of the user for the CAD. Therefore, there is a problem that it is difficult for a user whose experience and proficiency for the CAD are poor to check the route of the cable in the three-dimensional space.

An object of an embodiment is to provide a cable wiring program, a cable wiring method, and an information processing apparatus in which a route of a cable from an input connector to an output connector is displayed in a three-dimensional space.

SUMMARY

According to an aspect of the invention, a cable wiring method, wherein a route of a cable that connects a first connector of a first product and a second connector of a second product that are provided in an area surrounded by a plurality of columns, the method comprises; generating a provisional point at an intersection between a cable route along one of the columns and a plane that includes a coordinate of the axis in the height direction of the first connector and that is parallel to a plane of axes in depth direction and lateral direction; generating a first point at any position between a position away from the provisional point by the length of a certain bend radius of the cable in the lateral direction and a position determined by a coordinate of the axis in the lateral direction of the first connector; and generating a second point at any position between a position away from the provisional point by the length of a certain bend radius on the route and a position determined by the coordinate of the axis in the height direction of the second connector on the route.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating a connection example of a power cable in a two-dimensional plane;

FIG. 5 is a diagram illustrating an example of definition content of an input connector in input side product library information;

FIG. 6 is a diagram illustrating an example of definition content of an output connector in output side product library information;

FIG. 8 is a diagram illustrating an example of relay point library information of the CMA and an example of definition content of the relay points;

FIG. 9 is a diagram illustrating an example of defined items of a cable bus and defined information of the cable bus;

FIG. 10 is a diagram illustrating an example of power cable information;

FIG. 19 is a diagram illustrating an example of a three-dimensional display;

DESCRIPTION OF EMBODIMENTS

Embodiments of a cable wiring program, a cable wiring method, and an information processing apparatus of the technology are described below in detail with reference to the drawings.

Figure 1:
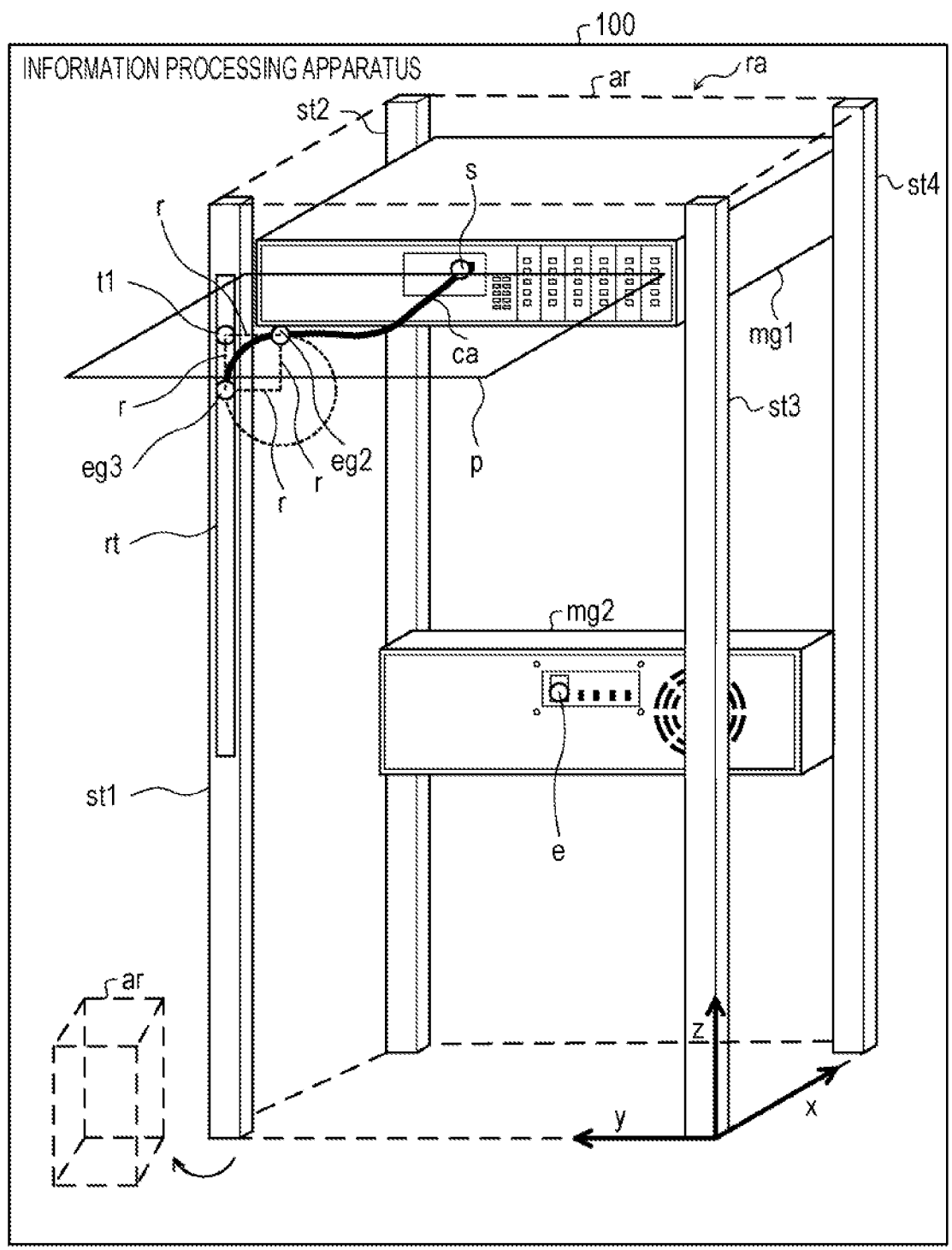
FIG. 1 is a diagram illustrating an operation example of an information processing apparatus according to an embodiment.

FIG. 1 is a diagram illustrating an operation example of an information processing apparatus according to an embodiment. An information processing apparatus 100 is a computer that determines a route of a cable ca that connects a first connector of a first product mg1 mounted on a rack ra and a second connector of a second product mg2 mounted on the rack ra, and displays the determined route of the cable ca three-dimensionally. The rack ra, the first product mg1, the second product mg2, and the like, are simulated, for example, in a simulation space in which a coordinate system of three axes that are perpendicular to each other has been defined. The three axes are an x axis in a depth direction, a y axis in a lateral direction, and a z axis in a height direction. In the present embodiment, the first connector of the first product mg1 is also referred to, for example, as an input connector, and the second connector of the second product mg2 is also referred to, for example, as an output connector.

The simulation space is a virtual three-dimensional space simulated using a computer. Specifically, the simulation space is, for example, a space that has been virtually configured in the information processing apparatus 100 by a three-dimensional CAD.

The first product mg1 and the second product mg2 are, for example, different products. The first product mg1 is disposed in an area ar surrounded by a plurality of columns st1 to st4 that are provided in the rack ra, these being a plurality of columns parallel to the z axis. The second product mg2 is disposed in the area ar at a position different from the position of the first product mg1. In the example of FIG. 1, the number of columns st1 to st4 is four. Information on each of the first product mg1, the second product mg2, and the rack ra, respectively indicating their apexes, lengths, faces, colors and the like, is read into the three-dimensional CAD, thereby enabling each of the first product mg1, the second product mg2, and the rack ra to be placed in the simulation space.

Up to now, a length of a power cable for a product envisaged to be used as mounted to the rack ra, is of a fixed length, for example, 3 m in many cases. Although different cable lengths may be selected in recent years, it is difficult for those who are not familiar with a cabling work, etc. to select an appropriate length of a cable. In addition, it is likely that those who select a cable would procure the longer cable ca so as to make the procurement easier and secure a margin in the cable length. The actual back side of the rack ra accordingly is likely to exhibit a state of high density cabling due to an excess length processing of the cable ca.

In a connection diagram of connection between apparatuses for designing a rack ra based system, a two-dimensional line drawing is used, as illustrated in FIG. 2, described later. A cable length is not considered in the line drawing, as the cable length actually varies according to the position or the like at the product in the depth direction.

In addition, up to now, depending on the experience and the skill level of a user, it is troublesome and time consuming for the user to use CAD manually to develop a route of the cable ca between the input connector and the output connector in a three-dimensional simulation space. A less experienced or less skilled user is accordingly not able to confirm the route of cable ca using three-dimensional space. It takes time even for an experienced and skilled user to manually perform the same taking conditions of cable and the like into consideration.

In the present embodiment, the information processing apparatus 100 generates a respective pass point of the cable ca at a position inside the rack or on a column of the rack at least the certain cable bend radius length away from a provisional point, the provisional point being generated on the column of a rack where the product is mounted to and at the same height as the connector of the product. This enables a route of a power cable ca from the input connector to the output connector to be displayed in a three-dimensional space. Time to determine the route of the cable ca may also be reduced while the shape of the bent cable ca meets the conditions of the minimum bend radius of the cable ca. Thus, selection of the cable length may be performed with high accuracy.

First, since the route of the cable ca is a route of the cable ca from the input connector to the output connector, the information processing apparatus 100 generates a start point s at the position of the input connector and generates an end point e at the position of the output connector.

Next, the information processing apparatus 100 generates a first provisional point t1 at the intersection between a route rt along which the cable ca may be disposed and a plane that includes the z axis coordinate of the input connector and is parallel to a plane of the x axis and the y axis. The route rt along which the cable ca may be disposed is a route adjacent and parallel to one of the plural columns. The route rt is also referred to, for example, as a cable bus.

The information processing apparatus 100 generates a first point at some position between the position in the area ar and the certain cable ca bend radius r away from the first provisional point t1 on the y axis, and the position determined by the y coordinate of the input connector. The certain cable bend radius r is, for example, a value based on the minimum bend radius of the cable ca or a value based on the recommended allowable bend radius. The minimum bend radius is the minimum radius of the cable ca at which the cable ca is not liable to be damaged when used in a bent state, as measured at the center axis of the cable ca. The minimum bend radius is a value predetermined by the manufacturer or the like of the cable ca. If the cable ca is used in a bent state with a bend radius smaller than the minimum bend radius, it is likely to affect the life of the cable ca, causing an abnormality such as breakage of the cable ca to occur in a relatively short period of time. The cable ca may accordingly be used for a long time even in a bent state, if the shape of the bent cable ca meets the minimum bend radius.

When the cable ca is bent so that the shape of the cable ca has a radius of the minimum bend radius or greater, the shape of the cable ca is also referred to as meeting the minimum bend radius. When the cable ca is bent so that the shape of the cable ca has a radius smaller than the minimum bend radius, the shape of the cable ca is also referred to as not meeting the minimum bend radius.

The recommended allowable bend radius is a value adopting stricter conditions than the minimum bend radius. In the present embodiment, the certain bend radius r is, for example, the equivalent of the minimum bend radius. The first point is also referred to as a second pass point eg2, since, for example, the first point is the point where the cable ca passes. In the example of FIG. 1, the position with a distance of the certain bend radius r on the y axis, is the position away from the first provisional point t1 in the y axis minus direction by the certain bend radius r of the cable ca.

The information processing apparatus 100 generates a second point at some position between the position on the route rt and the certain bend radius r away from the generated first provisional point t1, and the position determined by the x coordinate of the output connector. The second point is also referred to as a third pass point eg3, since, for example, the second point is the point where the cable ca passes.

If the cable ca passes through the first provisional point t1, the shape of the bent cable ca does not meet the minimum bend radius. The information processing apparatus 100 thus generates a pass point that meets the minimum bend radius based on the first provisional point t1, as described above, thereby enabling a route of the cable ca to be determined so as to meet the minimum bend radius. When the cable ca passes through the second pass point eg2 and the third pass point eg3, the radius of a circle formed by the second pass point eg2 and the third pass point eg3 has the minimum bend radius.

A route of the cable ca from the input connector to the output connector may thus be created easily. The route of the cable ca from the input connector to the output connector may easily be displayed three-dimensionally. A user may accordingly comprehend the route of the cable ca intuitively or visually. In addition, by predetermining the number of pass points, determination of the route of the cable ca is made easy, enabling time to determine the route of the cable to be reduced. In addition, by determining the route of the cable ca, those who select the cable ca may determine the cable length more accurately.

FIG. 2 is a diagram illustrating a connection example of a power cable in a two-dimensional plane. When connection of the power cable ca is illustrated two-dimensionally, the cable ca connection is indicated by a straight line. In the example on the left side of FIG. 2, each section described as 1 to 8 represents a product, with each line drawn between products indicating a cable. Sections described as 1 to 3 indicate products on the input side, and sections described as 4 to 8 indicate products on the output side. A user may accordingly confirm connection relationship of the cable, for example, when connection of the cable is illustrated two-dimensionally.

In addition, a user may check the information on the cable ca such as the cable type, while confirming the connection of the power cable ca two-dimensionally. Here, the cable length is, for example, a physical length of the cable. A length for connection is, for example, a minimum cable length. A length for extraction is the cable length when a server is pulled out of the rack for maintenance or the like.

As illustrated in FIG. 2, since a line from the input connector to the output connector illustrated two-dimensionally is a straight line, it is difficult to comprehend an actual cable length. In the present embodiment which enables a three-dimensional display, a length of the route of the cable in a three-dimensional space may be obtained easily.

Hardware Configuration Example of the Information Processing Apparatus 100

Figure 3:
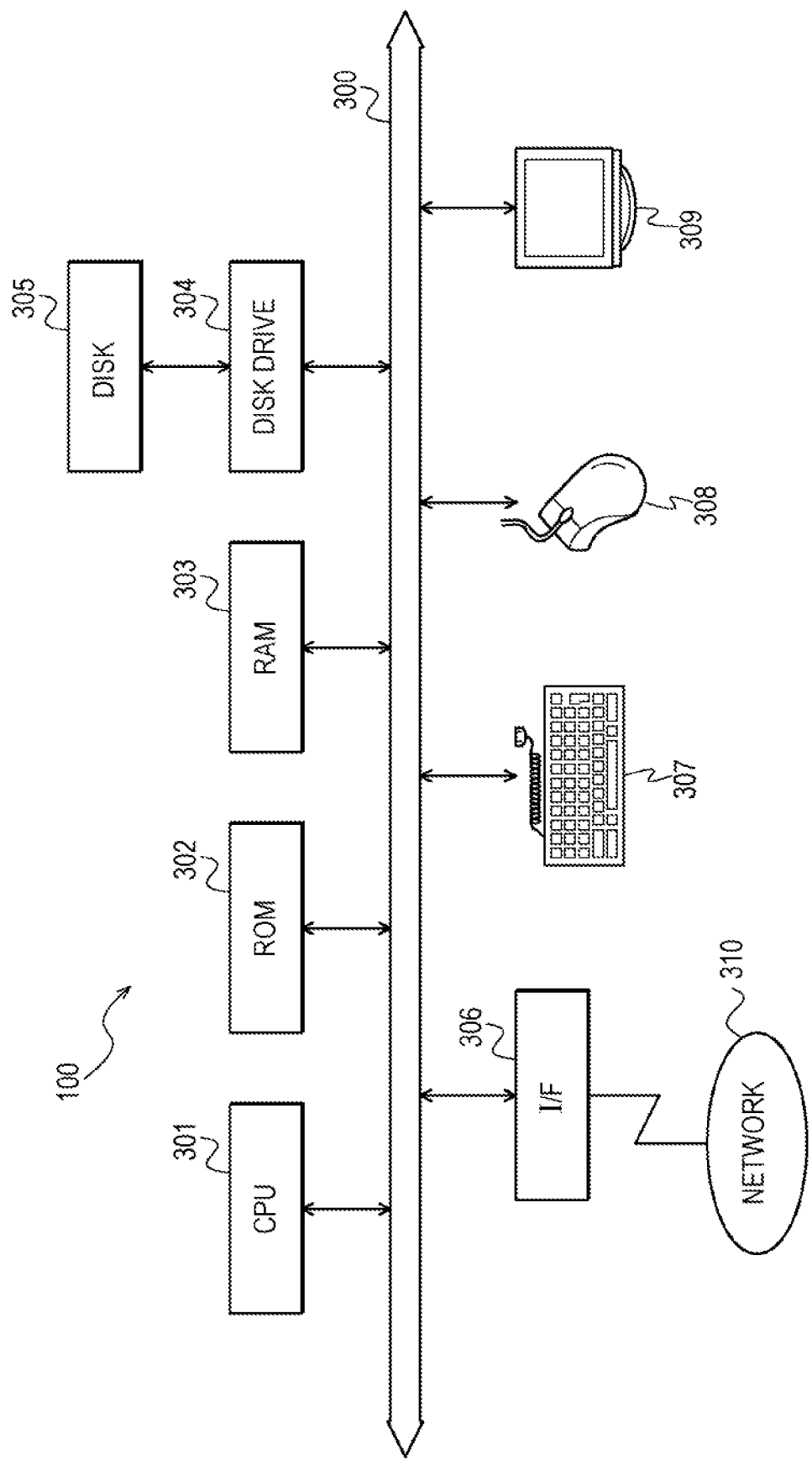
FIG. 3 is a diagram illustrating a hardware configuration example of the information processing apparatus.

FIG. 3 is a diagram illustrating a hardware configuration example of the information processing apparatus. The information processing apparatus 100 includes a central processing unit (CPU) 301 and a read only memory (ROM) 302. The information processing apparatus 100 also includes a random access memory (RAM) 303, a disk drive 304, and a disk 305. The information processing apparatus 100 further includes an interface (I/F) 306, a keyboard 307, a mouse 308, and a display 309. In addition, the CPU 301, the ROM 302, the RAM 303, the disk drive 304, the I/F 306, the keyboard 307, the mouse 308, and the display 309 are respectively coupled by a bus 300.

Here, the CPU 301 controls the whole information processing apparatus 100. The ROM 302 stores a program such as a boot program. The RAM 303 is used as a work area of the CPU 301. The disk drive 304 controls reading/writing of data against the disk 305 under the control by the CPU 301. The disk 305 stores data written under the control of the disk drive 304. Examples of the disk 305 include a magnetic disk and an optical disk.

The I/F 306 is connected to a network 310 such as a local area network (LAN), a wide area network (WAN), and the Internet through a communication line, and is connected to other apparatuses through the network 310. In addition, the I/F 306 controls the network 310 and an internal interface, and controls input/output of data from/to an external apparatus. For example, a modem, a LAN adapter, and the like, may be employed as the I/F 306.

The keyboard 307 and the mouse 308 are interfaces that perform input of various data operated by a user. The display 309 is an interface that outputs data instructed by the CPU 301.

In addition, although not illustrated in the drawings, the information processing apparatus 100 may include an input device that captures an image or a video through a camera and an input device that captures voice through a microphone. In addition, although not illustrated in the drawings, the information processing apparatus 100 may include an output device such as a printer.

In addition, a personal computer is described as an example of the hardware configuration of the information processing apparatus 100 of the present embodiment, but the embodiment is not limited thereto, and a server or the like may be employed. When the information processing apparatus 100 is a server, a device capable of being operated by a user, the display 309, and the like, may be connected to the information processing apparatus 100 through the network 310.

Functional Configuration Example of the Information Processing Apparatus 100

Figure 4:
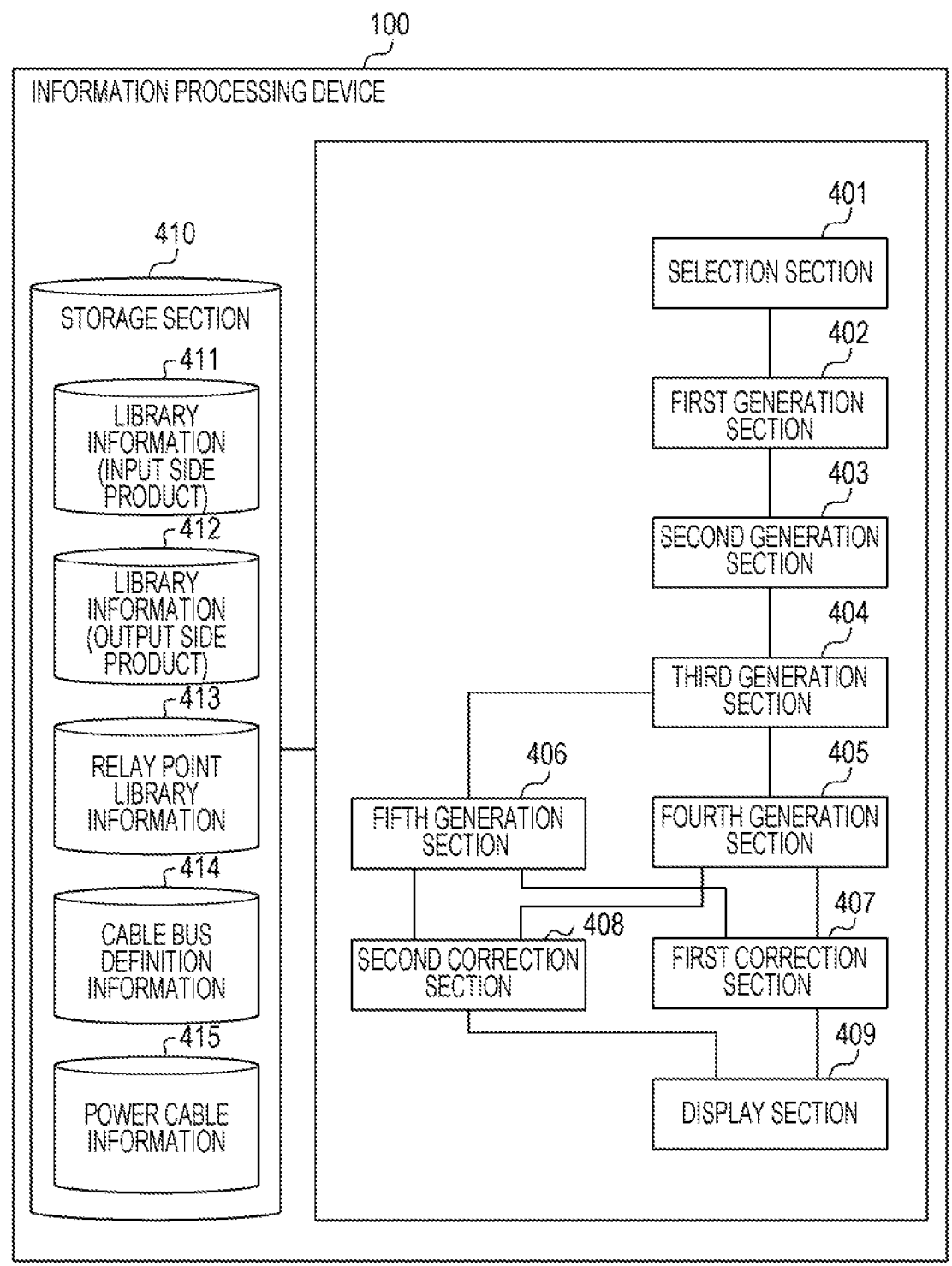
FIG. 4 is a block diagram illustrating a functional configuration example of the information processing apparatus.

FIG. 4 is a block diagram illustrating a functional configuration example of the information processing apparatus. The information processing apparatus 100 includes a selection section 401, a first generation section 402, a second generation section 403, a third generation section 404, a fourth generation section 405, a fifth generation section 406, a first correction section 407, a second correction section 408, a display section 409, and a storage section 410. Processing at the control sections which are the selection section 401 to the second correction section 408 is coded into a program stored in the storage section 410 such as the ROM 302, the RAM 303, and the disk 305 which are accessible by the CPU 301 illustrated in FIG. 3. Then, the CPU 301 reads the program from the storage section 410 and executes the process coded into the program. The processing at the control sections is thereby achieved. In addition, a processing result of the control sections is stored, for example, in the storage section 410.

In the present embodiment, as illustrated in FIG. 1, the x axis is the axis in the depth direction, the y axis is the axis in the lateral direction, and the z axis is the axis in the height direction.

The storage section 410 illustrated in FIG. 4 includes, for example, library information 411 on input side products and library information 412 on output side products. In addition, the storage section 410 includes relay point library information 413 for a CMA (Cable Management Arm), cable bus definition information 414, and power cable information 415. In addition, although not illustrated in the drawings, the storage section 410 includes, for example, rack information indicating the size and the position of the rack ra. Each pieces of information may also be obtained by the information processing apparatus 100 through the network 310.

FIG. 5 is a diagram illustrating a definition content example of the input connector in the library information on the input side product. The input side product is, for example, the first product mg1. The library information 411 on the input connector of the first product mg1 includes, for example, fields for a connector name, an x coordinate, a y coordinate, a z coordinate, a vector, a cable bus 1, a cable bus 2, and connection priority order.

An identifier for a connector is set to the connector name field. An x coordinate value from a product origin is set to the x coordinate field. The product origin is, for example, a global origin set in a simulation space, and is an origin in a relative coordinate system.

A y coordinate value from a product origin is set to the y coordinate field. The product origin is, for example, a global origin set in a simulation space, and is an origin in a relative coordinate system. A z coordinate value from a product origin is set to the z coordinate field. The product origin is, for example, a global origin set in a simulation space, and is an origin in a relative coordinate system.

A direction in which the cable ca is headed is set to the vector field. A route of the cable ca in the z direction on the rack ra side is set to the cable bus 1 field. Specifically, for example, "left" or "right" is set to the cable bus 1 field. A route of the cable ca in the z direction on the rack ra side of the rack ra when there is a CMA is set to the cable bus 2 field. The CMA is optional, and a user may select whether or not to use a CMA. Specifically, for example, "left" or "right" is set to the cable bus 2 field. When there are plural connectors in the product, the order of connection is set to the connection priority order field.

FIG. 6 is a diagram illustrating a definition content example of the output connector in the library information on the output side product. The output side product is, for example, the second product mg2. The library information 412 on the output connector of the second product mg2 includes, for example, fields for a connector name, an x coordinate, a y coordinate, a z coordinate, a vector, and connection priority order.

An identifier for a connector is set to the connector name field. An x coordinate value from a product origin is set to the x coordinate field. The product origin is, for example, a global origin set in a simulation space, and is an origin in a relative coordinate system.

A y coordinate value from a product origin is set to the y coordinate field. A z coordinate value from a product origin is set to the z coordinate field. A direction in which the cable is headed is set to the vector field. When there are plural connectors in the product, the order of connection is set to the connection priority order field.

Figure 7:
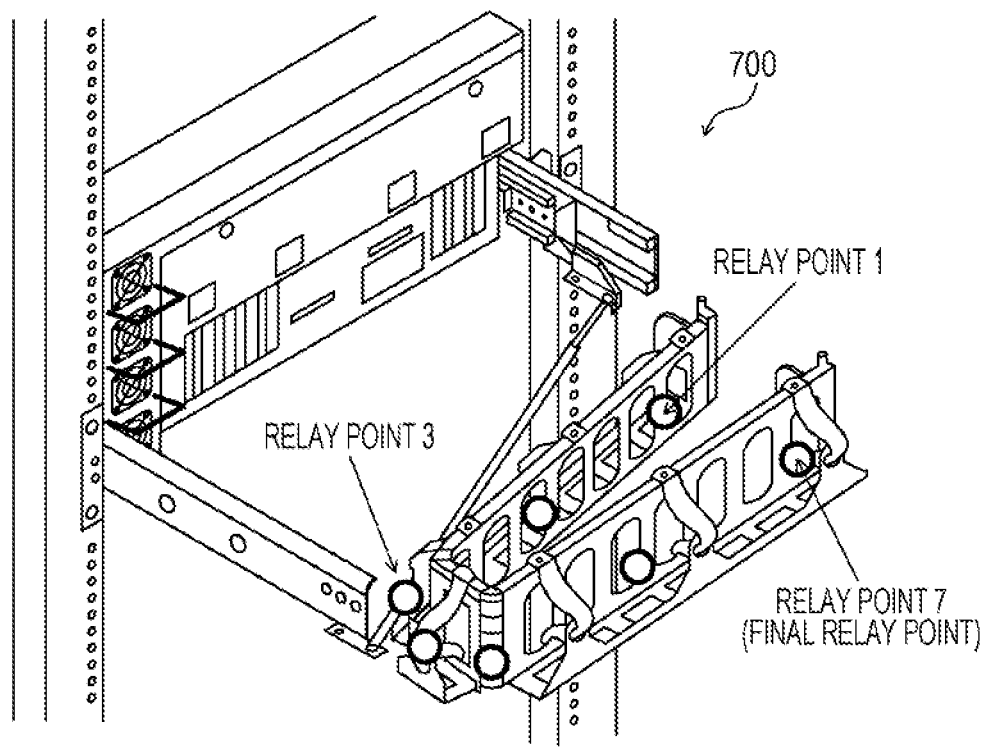
FIG. 7 is a diagram illustrating a configuration example of relay points to a cable management arm (CMA)

FIG. 7 is a diagram illustrating an example of setting of relay points to a CMA. A CMA 700, for example, bundles together cables ca on the back side of the server. The relay point is, for example, a point through which cables ca are relayed at the CMA 700. In the example of FIG. 7, the CMA 700 includes relay points 1 to 7 indicated by circles. The relay point 7 is the final relay point. When the CMA 700 is used, the final relay point is a first pass point described later.

FIG. 8 is a diagram illustrating an example of the relay point library information of the CMA and a definition content of the relay points. The relay point library information 413 describes the relay points as illustrated in FIG. 7. The relay point library information 413 includes fields for an x coordinate, a y coordinate, a z coordinate, a vector direction, and connection order designation.

An x coordinate of a relay point configured on the CMA 700 in the simulation space is set to the relay point x coordinate field. A relay point x coordinate is, for example, a value of the relay point x coordinate from the CMA origin. The CMA origin is an origin in an absolute coordinate system defined on the CMA 700, unlike the above-described relative coordinate system.

A y coordinate of a relay point configured on the CMA 700 is set to the relay point y coordinate field. A relay point y coordinate is, for example, a value of the relay point y coordinate from the CMA origin. A z coordinate of a relay point configured on the CMA is set to the relay point z coordinate field. A relay point z coordinate is, for example, a value of the relay point z coordinate from the CMA origin. A direction in which the cable ca that passes through the CMA 700 is headed is set to the relay point vector direction field. Connection order of each relay point is set to the relay point connection order designation field. A relay point with the last connection order designation is the final pass point.

The relay point library information 413, set up with information in each field, is stored as records (for example, 800-1, 800-2, etc.). In an example of the record 800-1, the x coordinate is "−55", the y coordinate is "50", the z coordinate is "22.5", the vector direction is "0, −1, 0", and the connection order designation is "1". In the example of the relay point library information 413, which include connection orders ranging from 1 to 7, the record 800-7 for which the connection order is 7 represents the final pass point.

FIG. 9 is a diagram illustrating a definition content of the cable bus and an example of the cable bus definition information. The cable bus definition information 414 is, for example, information that includes a route rt along which the cable ca adjacent to one of the columns included in the rack ra may be disposed and that indicates a simple route from the input connector to the output connector. The route rt is also referred to as a cable bus as described above.

Figure 12:
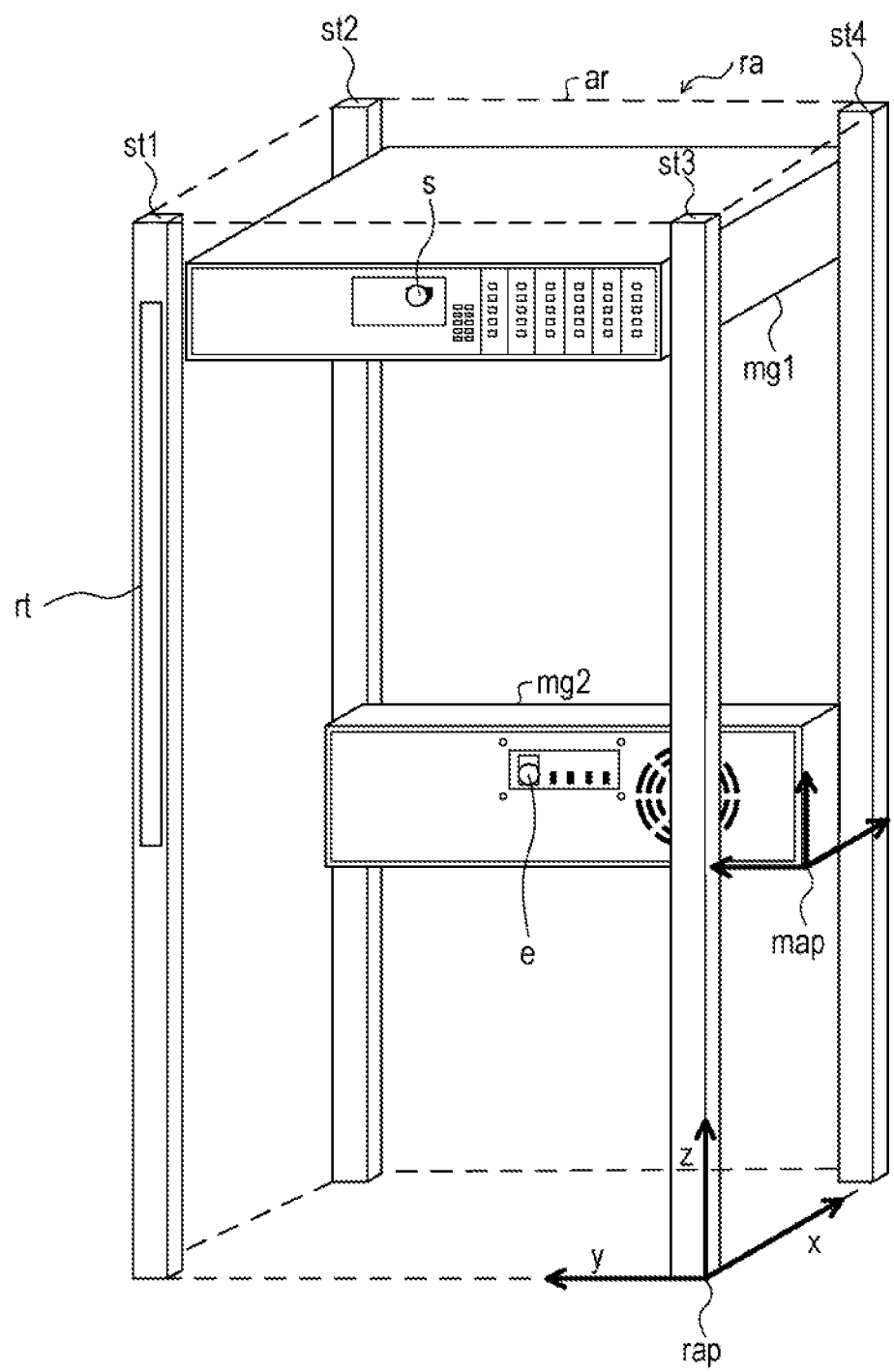
FIG. 12 is a diagram illustrating an example of a start point and an end point.

The value of an x coordinate from a rack origin is set to x coordinate field. The rack origin is an origin in an absolute coordinate system defined on the rack ra, unlike the above-described relative coordinate system. An example of the rack origin is illustrated in FIG. 12, described later. A value of a y coordinate from the rack origin is set to the y coordinate field.

A value of a z coordinate from the rack origin is set to the z coordinate field. The value of a z coordinate varies depending on the position of the mounted product and a discretionally set relay point on the product side. When there is a product relay point, a z coordinate of the final relay point out of the product relay points is set to the z coordinate field. When there is a CMA 700, the value of the z coordinate of the final relay point on the CMA 700 is set to the z coordinate field. When there is neither a product relay point nor a CMA final relay point, the value of a z coordinate for each connector in the product is set to the z coordinate field.

The vector field indicates a direction in which the cable ca is headed at the route of the cable ca. For example, out of z coordinate values between two points, a vector of a z coordinate with the input connector, this having a larger z coordinate value, is in the −z direction, and a vector with a smaller value is in the z direction.

The information processing apparatus 100 may determine the coordinates of the cable bus in the simulation space based on a coordinate value from the rack origin and the position of the rack ra in the simulation space.

FIG. 10 is a diagram illustrating an example of the power cable information. The power cable information 415 includes, for example, fields for a plug shape, a wire diameter, a rising distance, and the minimum bend radius. The power cable information 415, set up with information in each field, is stored as records (for example, 1000-1, 1000-2, etc.).

An identification information by which the shape of a plug may be uniquely identified is set to the plug shape field. A length of the cross section of the cable ca is set to the wire diameter field. A unit of the wire diameter is, for example, mm.

A length from the cable end to a position where the cable ca may be bent when the cable ca is inserted into the connector is set to the rising distance field. A unit of the rising distance is mm. The minimum radius of the cable ca at which the cable ca is not liable to be damaged when the cable ca used in a bent state is set to the minimum bend radius field. A unit of the minimum bend radius is mm. If a load is continuously applied to bend beyond the minimum bend radius, the cable ca may develop a breakage or the coating thereof may be cracked. In addition, as described above, the minimum bend radius is used as the certain bend radius r in the present embodiment. However, for example, an allowable bend radius may be used. The allowable bend radius is a value adopting stricter conditions than the minimum bend radius. Aging degradation is accordingly reduced when the cable ca is used applying the allowable bend radius rather than the minimum bend radius.

In FIG. 10, there are records having different shapes but having the same wire diameter, rising distance, and minimum bend radius such as the records 1000-1 and 1000-2. In an example of the record 1000-1, the plug shape is "NEMA 5-15P", the wire diameter is "8.5", the rising distance is "45", and the minimum bend radius is "40".

The selection section 401 selects a route on the left side when viewed from the rear face of the rack ra, as a cable bus route. In addition, when power supply units are provided as a dual system in a product and both power supply units are mountable in parallel in the horizontal direction, the selection section 401 selects both of the route on the left side and the route on the right side as cable bus routes. In addition, when power supply units are provided as a dual system in a product and both power supply units are mounted in parallel in the vertical direction, the selection section 401 selects at least one of the left side route and the right side route depending on the connector position.

Figure 11:
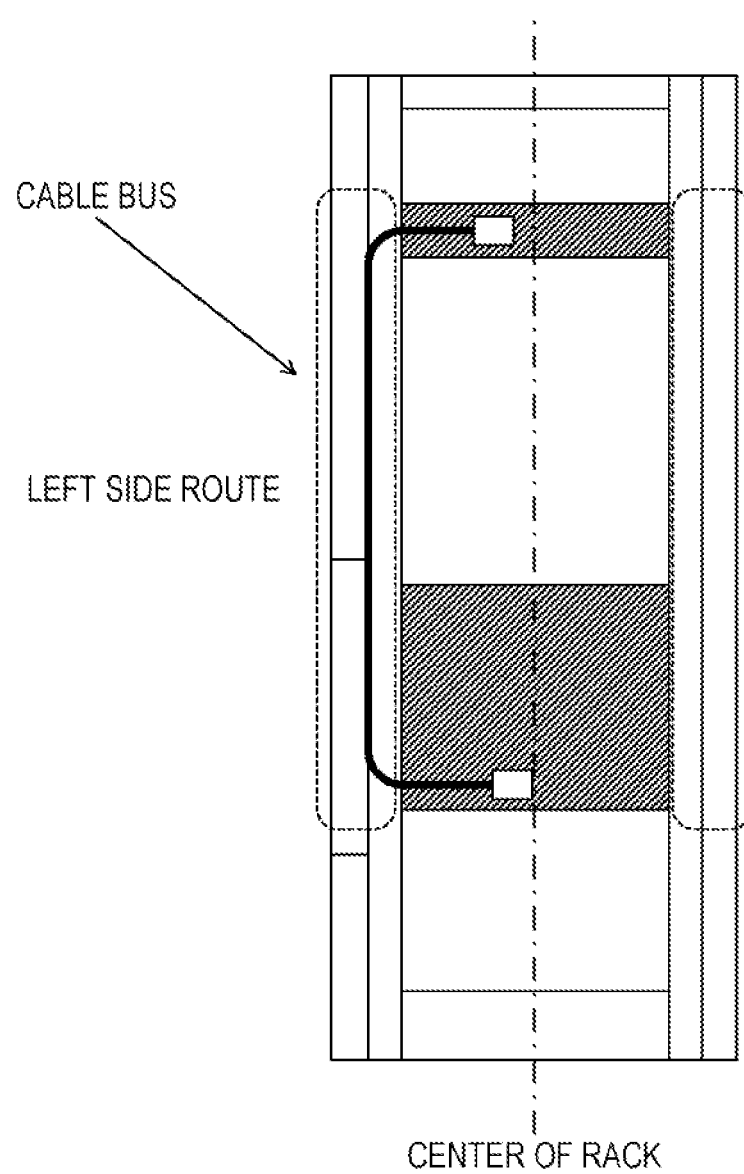
FIG. 11 is a diagram illustrating an example of a basic route.

FIG. 11 is a diagram illustrating an example of a basic route. In the rack ra, there are plural cable bus routes along which the cable ca may be disposed. For example, there are routes on the right side in the rack ra and routes on the left side of the rack ra. The basic routes are routes on the left side. Here, for example, the selection section 401 selects a route on the left side.

Generation of a Start Point and an End Point

The first generation section 402 generates a start point s based on the position of the input connector according to the library information 411 on the input side product. In addition, the first generation section 402 generates an end point e based on the position of the output connector. For example, the start point s is the position of the input connector, and the end point e is the position of the output connector.

FIG. 12 is a diagram illustrating an example of a start point and an end point. In the example of FIG. 12, the rack ra includes columns st1 to st4. The first product mg1 and the second product mg2 are disposed in the area ar surrounded by the four columns st1 to st4. The start point s is the position of the input connector. The end point e is the position of the output connector. For example, "map" represents a product origin of the second product mg2. For example, "rap" represents a rack origin of the rack ra. Although not illustrated in the drawings, a product origin of the first product mg1 is also configured in the simulation space.

In the present embodiment, the route rt along which the cable ca may be disposed is a route that is adjacent and parallel to the column st1 out of plural columns st1 to st4. As described above, the route rt is also referred to as a cable bus.

Generation of a First Pass Point to a Third Pass Point

The second generation section 403 illustrated in FIG. 4 generates a third point at a position in a certain direction away from the start point s by a length equal to a certain length at the both ends of the cable ca. The third point is also referred to, for example, as a first pass point. The certain direction is the direction of a vector included in the library information 411 on the input connector. In addition, the certain direction may be, for example, a depth direction and a direction towards the rear face of the rack ra. The certain length at the both ends of the cable is a rising distance according to the type of the cable ca. Specifically, the second generation section 403 determines the type of the cable ca, for example, according to the type of a power source. Then, the second generation section 403 obtains a rising distance included in the record 1000 that corresponds to the type of the cable ca from the power cable information 415, based on the type of the cable ca. Next, the second generation section 403 generates a first pass point in the direction of the vector included in the library information 411 on the input connector at a position away from the start point s by the obtained rising distance.

Next, the second generation section 403 determines a vector direction for the first pass point based on the route that has been selected by the selection section 401. When the selected route is the left route, the second generation section 403 determines the vector direction for the first pass point to be "y direction". Here, "y direction" is the plus direction at the y axis. When the selected route is the right route, the second generation section 403 determines the vector direction for the first pass point to be "−y direction". Here, "−y direction" is the minus direction at the y axis.

Figure 13:
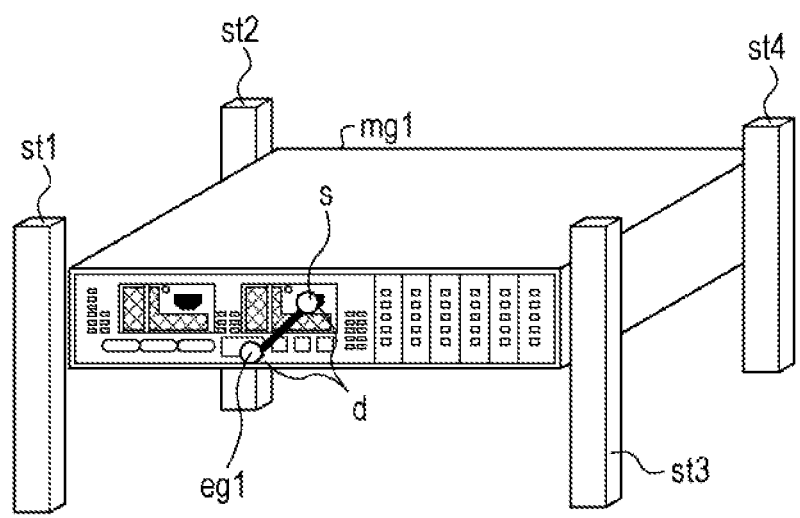
FIG. 13 is a diagram illustrating an example of a first pass point.

FIG. 13 is a diagram illustrating of an example of the first pass point. As illustrated in FIG. 13, the first pass point eg1 is at the position away from the start point s by the rising distance d.

When the CMA 700 is used, the second generation section 403 generates the first pass point eg1 at the final relay point at the CMA 700.

Next, the third generation section 404 illustrated in FIG. 4 generates the first provisional point t1 at the intersection between the route rt and a plane p that includes the z coordinate of the input connector and is parallel to the plane of the x axis and the y axis.

Figure 14:
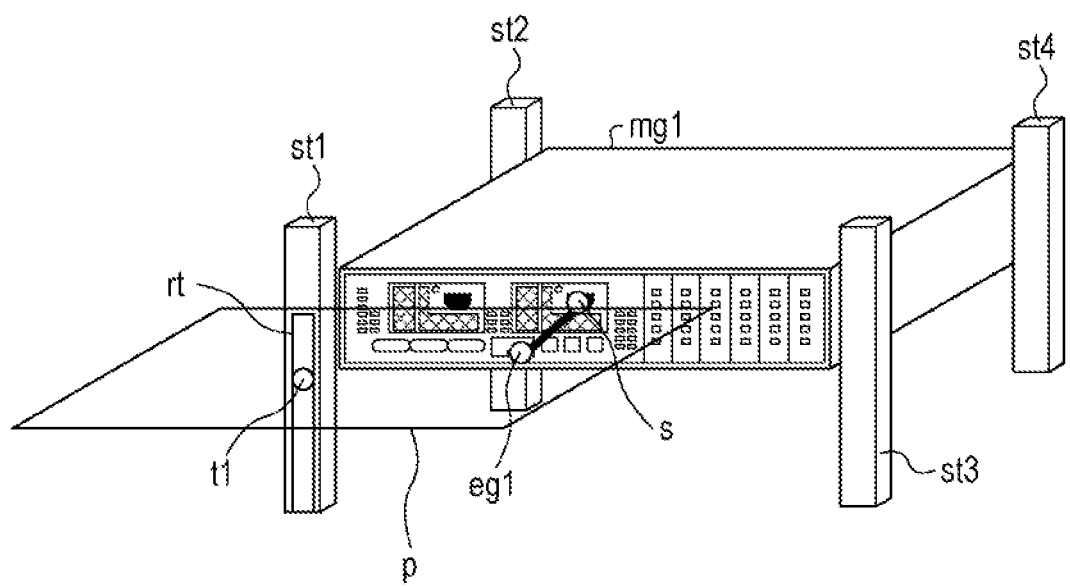
FIG. 14 is a diagram illustrating an example of a first provisional point.

FIG. 14 is a diagram illustrating an example of the first provisional point. The plane p is the plane that includes the coordinate of the z axis of the input connector and is parallel to the plane of the x axis and the y axis. The plane that includes the coordinate of the z axis of the input connector is a plane having a value of the same coordinate of the z axis as the coordinate of the z axis of the input connector. In addition, the first provisional point t1 is at the intersection of the plane p and the route rt.

Next, the fourth generation section 405 illustrated in FIG. 4 generates a first point at any position between the position away from the first provisional point t1 by the certain bend radius r of the cable ca on the y axis in the area ar and the position determined by the coordinate of the y axis of the input connector. Here, the first point is also referred to as a second pass point eg2 as described above. The position determined by the coordinate of the y axis of the input connector is, for example, a position that is not on the inner side of the rack ra than the coordinate of the y axis of the start point s.

In addition, the fourth generation section 405 illustrated in FIG. 4 may generate the second pass point eg2 at the position away from the first provisional point t1 by the certain bend radius r of the cable ca on the y axis in the area ar. By limiting the position of the second pass point eg2 to the position away from the first provisional point t1 by the certain bend radius r, when the product is a server, for example, the rear face of the server may be suppressed from being blocked by the cable ca. Thus, works such as maintenance and construction of the server are facilitated. In addition, air exhaust path of the server may be secured due to the rear face of the server suppressed from being blocked by the cable ca.

In addition, the fifth generation section 406 illustrated in FIG. 4 generates a second point at any position between the position away from the first provisional point t1 by the certain bend radius r on the route rt of the cable ca and the position determined by the coordinate of the x axis of the output connector on the route rt. Here, the second point is also referred to as a third pass point eg3 as described above.

In addition, the fifth generation section 406 may generate the third pass point eg3 at the position away from the first provisional point t1 by the certain bend radius r on the z axis on the route rt. By limiting the position of the third pass point eg3 to the position away from the first provisional point t1 by the certain bend radius r, when the product is a server, for example, the rear face of the server may be suppressed from being blocked by the cable ca. Thus, works such as maintenance and construction of the server may be facilitated. In addition, air exhaust path of the server may be secured due to the rear face of the server suppressed from being blocked by the cable ca.

Figure 15:
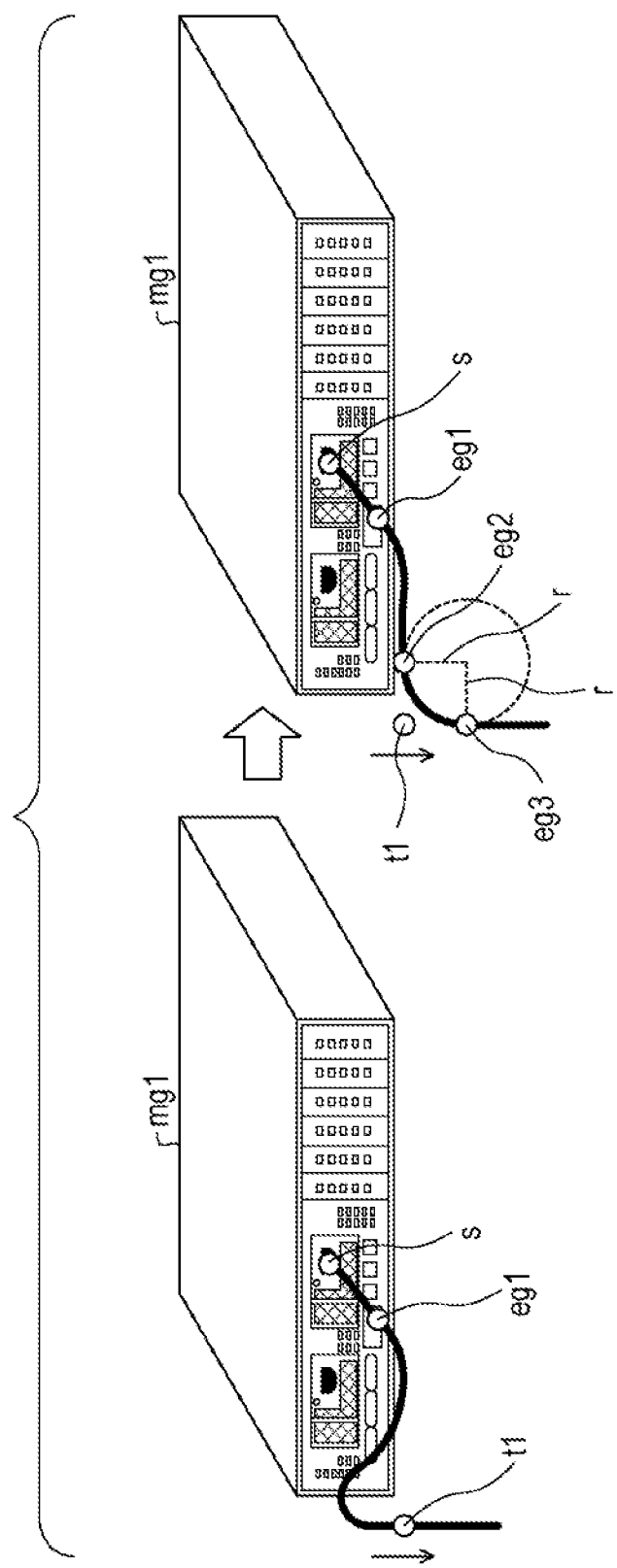
FIG. 15 is a diagram illustrating an example of a second pass point and a third pass point.

FIG. 15 is a diagram illustrating an example of the second pass point and the third pass point. As illustrated on the left side of FIG. 15, if the route of the cable ca is determined so that the cable ca passes through the first provisional point t1, the cable ca is bent in the direction of the z axis in order to maintain the direction of the vector at the first provisional point t1. The direction of the vector is determined based on the positional relationship between the first product mg1, the second product mg2, and the selected left side route. If there is a pass point between the position of the first provisional point t1 and the position away from the first provisional point t1 in the y axis direction by the minimum bend radius, the cable ca is bent in the upward direction similarly to the case in which the cable ca passes through the first provisional point t1.

Thus, so as not to cause the cable ca to be bent as illustrated on the left side in FIG. 15, the fourth generation section 405 generates the second pass point eg2 at the position away from the first provisional point t1 in the y axis direction by the minimum bend radius of the cable ca, as illustrated on the right side of FIG. 15. In addition, as illustrated on the right side of FIG. 15, the fifth generation section 406 generates the third pass point eg3 on the cable bus at the position away from the first provisional point t1 by the minimum bend radius in the z axis.

As illustrated on the right side of FIG. 15, in the case in which the cable ca passes through the second pass point eg2 and the third pass point eg3, if a circle is drawn with the bending portion of the cable ca as the radius, the radius of the circle equals the minimum bend radius.

Generation of a Fourth Pass Point to a Sixth Pass Point

Next, generation of a fourth pass point to a sixth pass point on the side of the end point e is described. First, the second generation section 403 generates a sixth point at a position in a certain direction away from the end point e by a length equal to a certain length at the both ends of the cable ca. The sixth point is also referred to, for example, as a sixth pass point. The certain direction is the direction of a vector included in the library information 412 on the output connector. In addition, the certain direction may be, for example, a depth direction and a direction towards the rear face of the rack ra. The certain length at the both ends of the cable ca is a rising distance according to the type of the cable ca.

Specifically, the second generation section 403 determines the type of the cable ca, for example, according to the type of a power source. Then, the second generation section 403 obtains a rising distance included in the record 1000 that corresponds to the type of the cable ca from the power cable information 415, based on the type of the cable ca. Next, the second generation section 403 generates the sixth pass point, for example, at the position away from the end point e in the direction of the vector included in the library information 411 on the output connector at a position away from the end point e by the obtained rising distance.

Next, the third generation section 404 illustrated in FIG. 4 generates a second provisional point at the intersection between the cable bus and a plane that includes the coordinate of the z axis of the output connector and is parallel to the plane of the x axis and the y axis.

Then, the fourth generation section 405 illustrated in FIG. 4 generates a fourth point at any position between the position away from the second provisional point in the z axis by the certain bend radius r on the cable bus and the position determined by the coordinate of the z axis of the output connector. Here, the fourth point is also referred to as a fourth pass point. In addition, the fourth generation section 405 may generate the fourth pass point at the position away from the second provisional point in the z axis by the certain bend radius r on the route rt. By limiting the position of the fourth pass point to the position away from the second provisional point by the certain bend radius r, when the product is a server, for example, the rear face of the server may be suppressed from being blocked by the cable ca. Thus, works such as maintenance and construction of the server may be facilitated. In addition, air exhaust path of the server may be secured due to the rear face of the server suppressed from being blocked by the cable ca.

Next, the fifth generation section 406 illustrated in FIG. 4 generates a fifth point at any position between the position away from the generated second provisional point by the certain bend radius r of the cable ca on the y axis in the area ar and the position determined by the coordinate of the y axis of the output connector. Here, the fifth point is also referred to as a fifth pass point. The certain bend radius r is, for example, the minimum bend radius.

In addition, the fifth generation section 406 may generate the fifth pass point at the position away from the generated second provisional point by the certain bend radius r of the cable ca on the y axis in the area ar. By limiting the position of the fifth pass point to the position away from the second provisional point by the minimum bend radius, when the product is a server, for example, the rear face of the server may be suppressed from being blocked by the cable ca. Thus, works such as maintenance and construction of the server may be facilitated. In addition, air exhaust path of the server may be secured due to the rear face of the server suppressed from being blocked by the cable ca.

Figure 16:
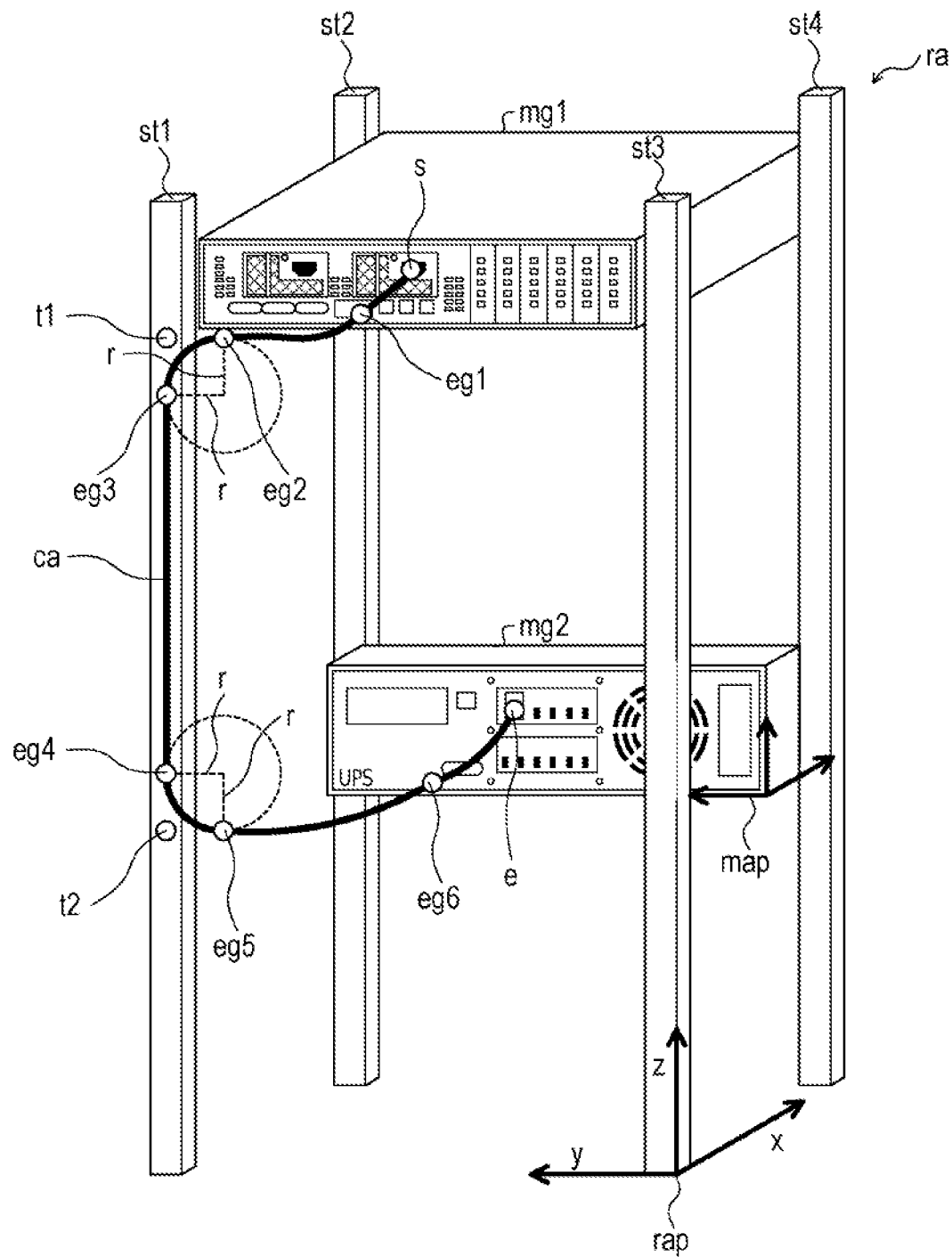
FIG. 16 is a diagram illustrating an example of six pass points and a cable.

FIG. 16 is a diagram illustrating an example of the six pass points and the cable. As illustrated in FIG. 16, the first pass point eg1 to the sixth pass point eg6 are generated. The first pass point eg1 to the third pass point eg3 are pass points on the input connector side. The first provisional point t1 is a point for generating the second pass point eg2 and the third pass point eg3.

The fourth pass point eg4 to the sixth pass point eg6 are pass points on the output connector side. The second provisional point t2 is a point for generating the fourth pass point eg4 and the fifth pass point eg5. The cable ca passes through the first pass point eg1 to the sixth pass point eg6 between the start point s to the end point e.

Correction of the Pass Points

Figure 17:
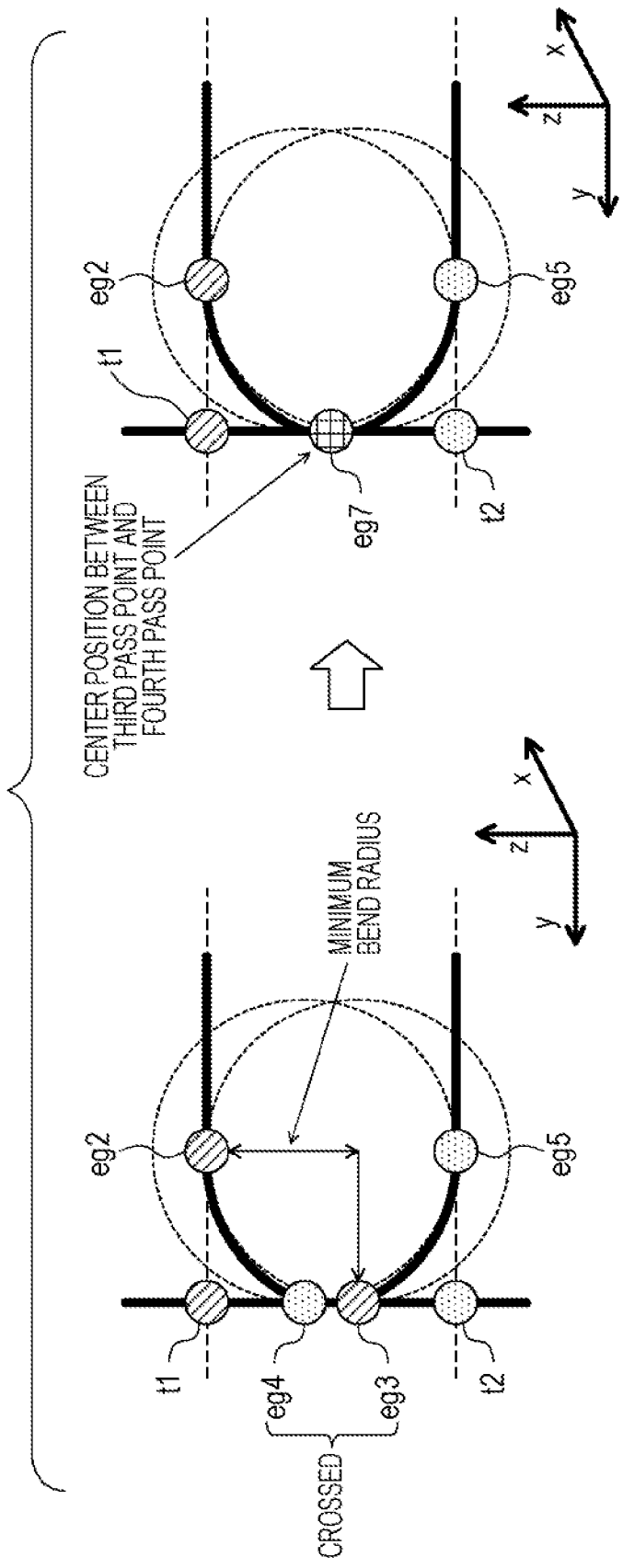
FIG. 17 is a diagram illustrating an example in which a third pass point and a fourth pass point are corrected.

FIG. 17 is a diagram illustrating an example in which the third pass point and the fourth pass point are corrected. When a positional relationship in the height direction between the first product mg1 and the second product mg2 satisfies the following relational expression, the third pass point eg3 and the fourth pass point eg4 sometimes cross each other on the z axis as illustrated on the left side of FIG. 17.

The height of the start point $s$ of the first product−
the height of the end point $e$ of the second
product<2×certain bend radius $r$ Thus, when the above-described relational expression is satisfied and the third pass point eg3 is positioned lower than the fourth pass point eg4 in the height direction, the first correction section 407 illustrated in FIG. 4 generates a seventh point. Then, the first correction section 407 deletes the third pass point eg3 and the fourth pass point eg4. Here, the seventh point is also referred to, for example, as a seventh pass point eg7. Specifically, as illustrated on the right side of FIG. 17, the first correction section 407 generates a seventh pass point eg7, for example, at the center position between the third pass point eg3 and the fourth pass point eg4 on the z axis.

When a distance between the first pass point eg1 and the first provisional point t1 in the lateral direction is less than the certain bend radius r, the second correction section 408 illustrated in FIG. 4 deletes the second pass point eg2. The second correction section 408 does not delete the second pass point eg2 when the distance between the first pass point eg1 and the first provisional point t1 in the lateral direction is not less than the certain bend radius r.

The example is described above in which the correction is performed so that the second pass point eg2 is deleted by the second correction section 408, but the embodiment is not limited thereto, and for example, the fourth generation section 405 may choose not to generate the second pass point eg2, for example, when the length between the first pass point eg1 and the first provisional point t1 in the lateral direction is less than the minimum bend radius.

In addition, when the length between the sixth pass point eg6 and the second provisional point t2 in the lateral direction is less than the certain bend radius r, the second correction section 408 deletes the fifth pass point eg5. The second correction section 408 does not delete the fifth pass point eg5 when the length between the sixth pass point eg6 and the second provisional point t2 in the lateral direction is not less than the certain bend radius r.

The example is described above in which the fifth pass point eg5 is deleted by the second correction section 408, but the embodiment is not limited thereto, and for example, the fourth generation section 405 may choose not to generate the fifth pass point eg5 when the length between the sixth pass point eg6 and the second provisional point t2 in the lateral direction is less than the minimum bend radius.

Figure 18:
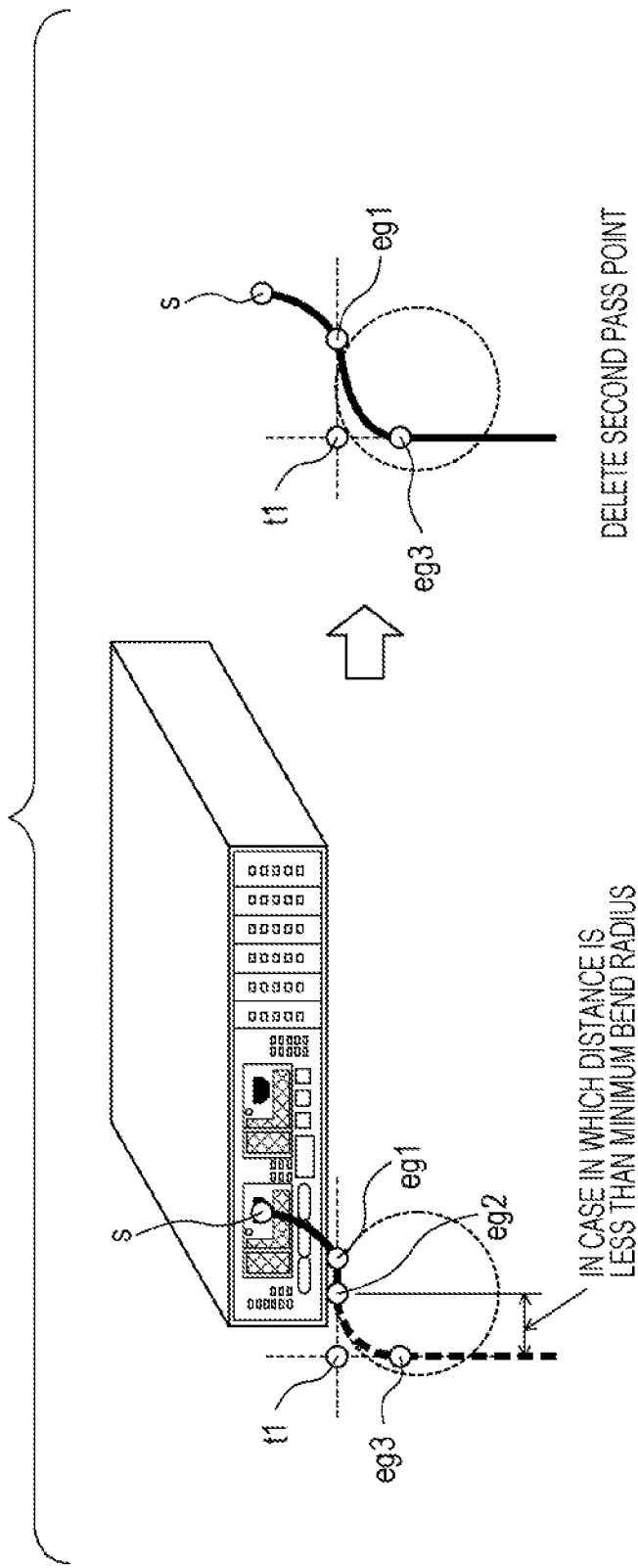
FIG. 18 is a diagram illustrating a correction example of the second pass point.

FIG. 18 is a diagram illustrating a correction example of the second pass point. As illustrated in FIG. 18, for example, there is a case in which a distance between the first pass point eg1 and the cable bus becomes less than the minimum bend radius when a distance between the input connector and the cable bus is short. In this case, the second correction section 408 deletes the second pass point eg2 because the cable ca may be bent without passing through the first provisional point t1 as long as the cable ca passes through the first pass point eg1 even if the second pass point eg2 is not provided. Although not illustrated in the drawings, the same also applies to the fifth pass point eg5.

In addition, the information processing apparatus 100 inputs an extensible markup language (XML) file in which, for example, mount location information, pass point location information, connector location information, and the like are described to an existing three-dimensional viewer. This enables the information processing apparatus 100 to create a route of the power cable ca in the three-dimensional space. Accordingly, it is sufficient for the display section 409 to display the created route of the cable ca on the display 309 or the like.

FIG. 19 is a diagram illustrating an example of a three-dimensional display. As illustrated on the upper side of FIG. 19, the display section 409 may display a screen 1900 of a three-dimensional image of servers mounted on the rack ra, on the display 309 or the like. Further, as illustrated on the lower side of FIG. 19, the display section 409 may generate information in which the cable ca has been drawn based on the generated pass points, and display a screen 1901 of a three-dimensional image in which connection of the cables ca is drawn based on the generated information, on the display 309.

Procedure Example of the Cable Wiring Processing by the Information Processing Apparatus 100

Figure 20:
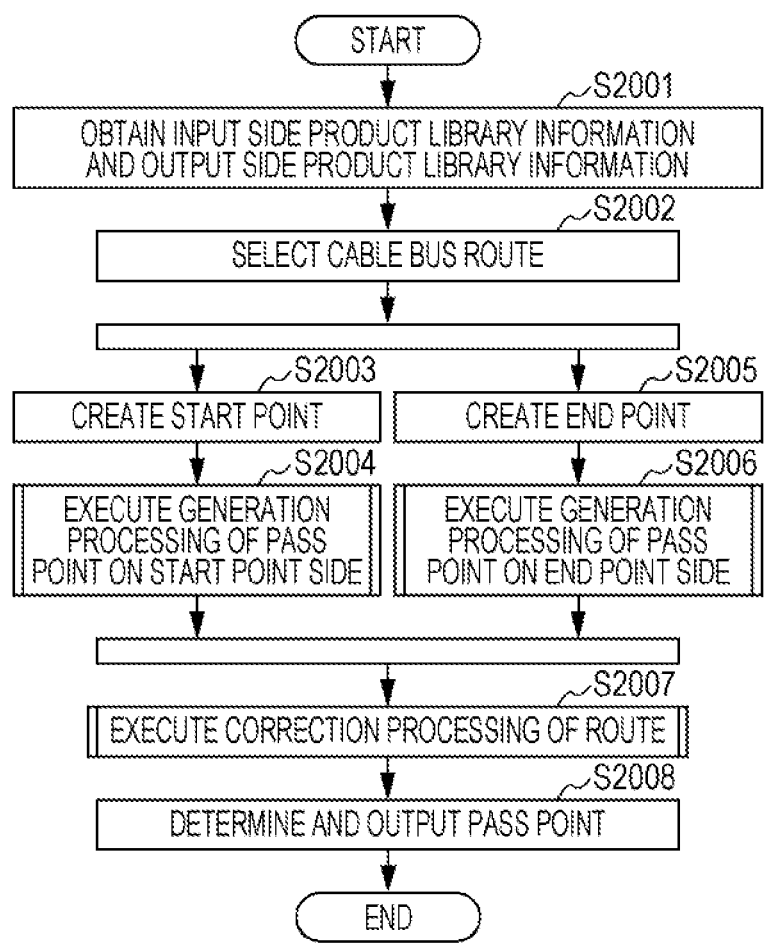
FIG. 20 is a flowchart illustrating an example of cable wiring processing procedure by the information processing apparatus.

FIG. 20 is a flowchart illustrating a procedure example of the cable wiring processing by the information processing apparatus. Here, an example is described in which the input connector is larger than the output connector in the z axis direction. The information processing apparatus 100 obtains library information on the input side product and library information on the output side product (Step S2001). The information processing apparatus 100 selects a cable bus route (Step S2002). Here, the double line indicates a parallel processing. Although illustrated as a parallel processing since the order is irrelevant, the order may be determined, for example, in which the information processing apparatus 100 generates pass points on the output connector side after generating pass points on the input connector side.

After Step S2002, the information processing apparatus 100 creates a start point s (Step S2003). The information processing apparatus 100 executes a generation processing of pass points on the side of the start point s (Step S2004), and the flow proceeds to Step S2007.

In addition, after Step S2002, the information processing apparatus 100 generates an end point e (Step S2005). Then, the information processing apparatus 100 executes generation processing of pass points on the side of the end point e (Step S2006), and the flow proceeds to Step S2007.

After Steps S2004 and S2006, the information processing apparatus 100 executes correction processing of the route (Step S2007). The information processing apparatus 100 determines the pass points and performs output of the pass points (Step S2008), and ends the series of processes.

Figure 21:
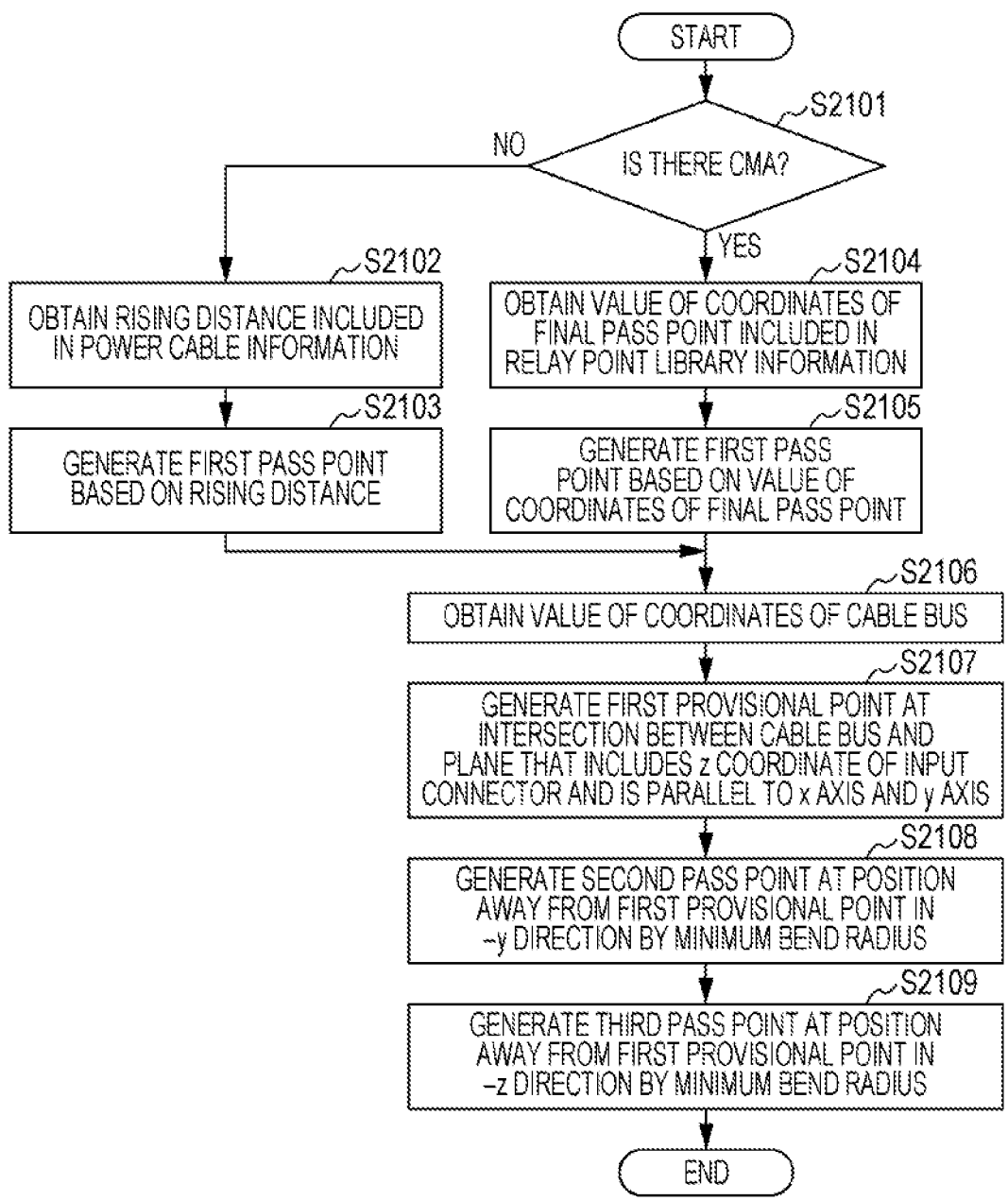
FIG. 21 is a flowchart illustrating detailed explanation of start point side pass points generation processing (Step S2004) illustrated in FIG. 20.

FIG. 21 is a flowchart illustrating the detail of the generation processing of the pass points on the start point side illustrated in FIG. 20 (Step S2004). The information processing apparatus 100 determines whether or not there is a CMA 700 (Step S2101).

When the information processing apparatus 100 determines that there is no CMA 700 (Step S2101: No), the information processing apparatus 100 obtains the rising distance included in the power cable information 415 (Step S2102). Then, the information processing apparatus 100 generates the first pass point eg1 based on the rising distance (Step S2103), and the flow proceeds to Step S2106.

When the information processing apparatus 100 determines that there is a CMA 700 (Step S2101: Yes), the information processing apparatus 100 obtains a value of the coordinates of the final pass point included in the relay point library information 413 (Step S2104). Then, the information processing apparatus 100 generates the first pass point eg1 based on the value of the coordinates of the final pass point (Step S2105), and the flow proceeds to Step S2106.

The information processing apparatus 100 obtains a value of the coordinates of the cable bus (Step S2106). Then, the information processing apparatus 100 generates the first provisional point t1 at the intersection between the cable bus and the plane p that includes the z coordinate of the input connector and is parallel to the x axis and the y axis (Step S2107). The information processing apparatus 100 generates the second pass point eg2 at the position away from the first provisional point t1 in the −y direction by the minimum bend radius of the cable ca (Step S2108). Next, the information processing apparatus 100 generates the third pass point eg3 at the position away from the first provisional point t1 in the −z direction by the minimum bend radius of the cable ca (Step S2109), and ends the series of processes. The order of Steps S2108 and S2109 may be reversed.

Figure 22:
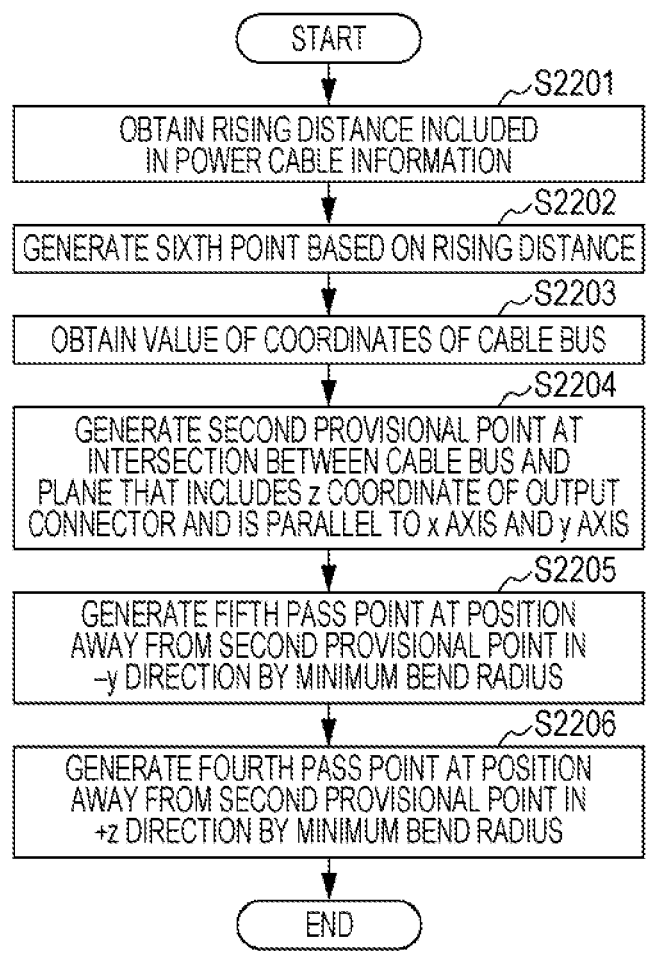
FIG. 22 is a flowchart illustrating detailed explanation of end point side pass points generation processing (Step S2006) illustrated in FIG. 20.

FIG. 22 is a flowchart illustrating the detail of the generation processing of the pass points on the end point side illustrated in FIG. 20 (Step S2006). First, the information processing apparatus 100 obtains the rising distance included in the power cable information 415 (Step S2201). Then, the information processing apparatus 100 generates the sixth pass point eg6 based on the rising distance (Step S2202). Next, the information processing apparatus 100 obtains a value of the coordinates of the cable bus (Step S2203).

Next, the information processing apparatus 100 generates the second provisional point t2 at the intersection between the cable bus and the plane p that includes the z coordinate of the output connector and is parallel to the x axis and the y axis (Step S2204). The information processing apparatus 100 generates the fifth pass point eg5 at the position away from the second provisional point t2 in the −y direction by the minimum bend radius of the cable ca (Step S2205). Then, the information processing apparatus 100 generates the fourth pass point eg4 at the position away from the second provisional point t2 in the +z direction by the minimum bend radius of the cable ca (Step S2206), and ends the series of processes. The order of Steps S2205 and S2206 may be reversed, and not restrictive.

Figure 23:
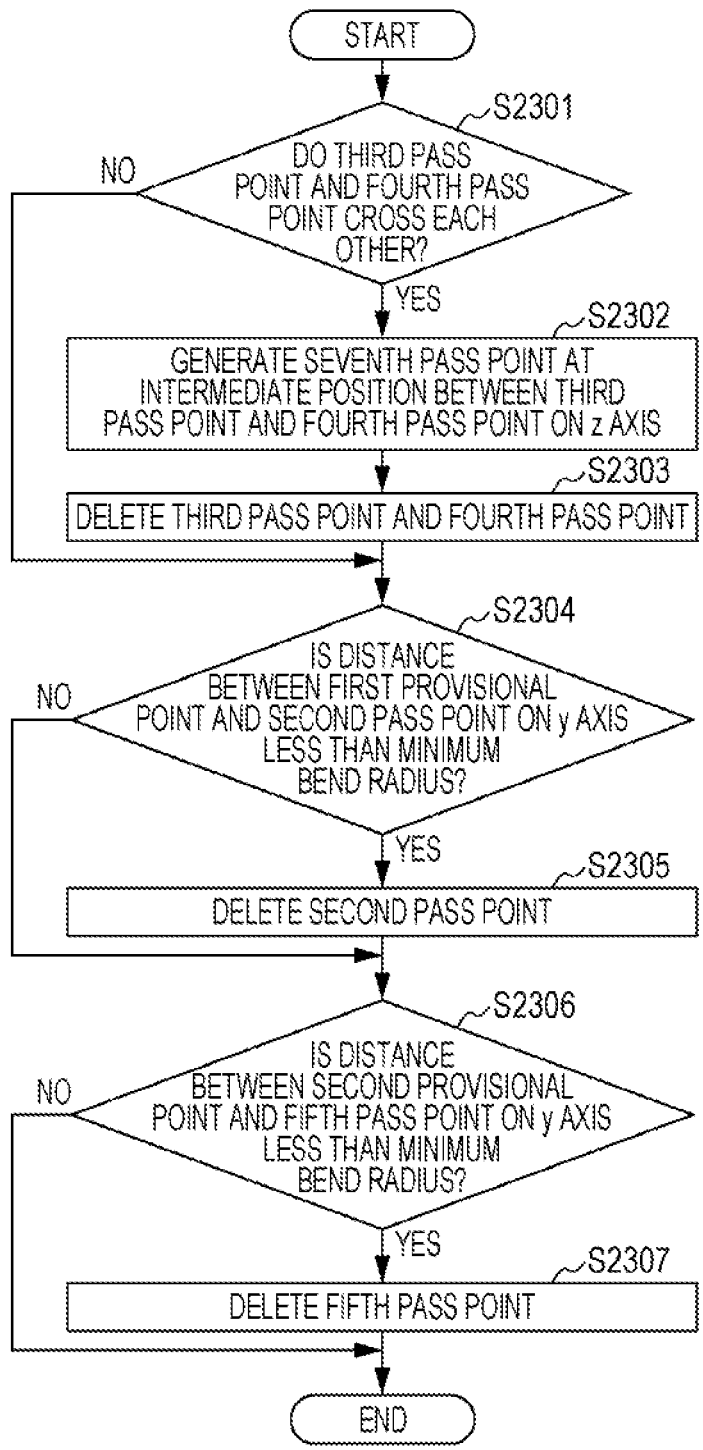
FIG. 23 is a flowchart illustrating detailed explanation of route correction processing (Step S2007) illustrated in FIG. 20.

FIG. 23 is a flowchart illustrating the detail of the correction processing of the route illustrated in FIG. 20 (Step S2007). The information processing apparatus 100 determines whether or not the third pass point eg3 and the fourth pass point eg4 cross each other (Step S2301). If the information processing apparatus 100 determines that the third pass point eg3 and the fourth pass point eg4 do not cross each other (Step S2301: No), the information processing apparatus 100 proceeds to Step S2304.

If the information processing apparatus 100 determines that the third pass point eg3 and the fourth pass point eg4 cross each other (Step S2301: Yes), the information processing apparatus 100 generates a seventh pass point eg7 at the center position between the third pass point eg3 and the fourth pass point eg4 on the z axis (Step S2302). Then, the information processing apparatus 100 deletes the third pass point eg3 and the fourth pass point eg4 (Step S2303).

Next, the information processing apparatus 100 determines whether or not a distance between the first provisional point t1 and the second pass point eg2 on the y axis is less than the minimum bend radius (Step S2304). If the information processing apparatus 100 determines that the distance is not less than the minimum bend radius (Step S2304: No), the information processing apparatus 100 proceeds to Step S2306.

If the information processing apparatus 100 determines that the distance is less than the minimum bend radius (Step S2304: Yes), the information processing apparatus 100 deletes the second pass point eg2 (Step S2305). The information processing apparatus 100 determines whether or not a distance between the second provisional point t2 and the fifth pass point eg5 on the y axis is less than the minimum bend radius (Step S2306). If the information processing apparatus 100 determines that the distance is not less than the minimum bend radius (Step S2306: No), the information processing apparatus 100 ends the series of processes.

If the information processing apparatus 100 determines that the distance is less than the minimum bend radius (Step S2306: Yes), the information processing apparatus 100 deletes the fifth pass point eg5 (Step S2307), and ends the series of processes.

As described above, the information processing apparatus 100 generates a respective pass point of the cable at a position inside the rack or on a column of the rack at least the certain cable bend radius length away from a provisional point, the provisional point being generated on the column of a rack the product is mounted to and at the same height as the connector of the product. This enables a route of a power cable ca from the input connector to the output connector to be displayed in a three-dimensional space. This thereby enables a route of the cable from the input connector to the output connector to be displayed in the three-dimensional space. Time to determine the route of the cable ca may be reduced compared to manual method or the like while the shape of the bent cable ca meets the conditions of the minimum bend radius of the cable ca.

The certain bend radius is a value based on the minimum bend radius of the cable. In this manner, a route of the cable may be configured under a condition in which the cable ca may be bent most out of the bend radius conditions of the cable ca with low probability of a failure such as breakage occurring. Accordingly, the rear face of the server may be suppressed from being blocked by the cable.

The information processing apparatus 100 generates the first point at the position away from the first provisional point by the minimum bend radius on the axis in the lateral direction in the area. When the product is a server, for example, the rear face of the server may accordingly be suppressed from being blocked by the cable. Thus, the works such as maintenance and construction of the server are facilitated.

In addition, the information processing apparatus 100 generates the third point at the position in the certain direction away from the position of the input connector by a certain length at the both ends of the cable, and does not generate the first point if a distance between the generated third point and the generated first provisional point is less than the certain bend radius. As a result, the pass point may be reduced and a route of the cable that more closely meets the bend radius condition may be created.

In addition, the information processing apparatus 100 generates a second point at a position on a route on which the cable may be disposed and away from the generated first provisional point by the minimum bend radius. When the product is a server, for example, the rear face of the server may accordingly be suppressed from being blocked by the cable. Thus, the works such as maintenance and construction of the server are facilitated.

On the output connector side, the information processing apparatus 100 generates a provisional point at the position that does not meet the certain bend radius if the position is included in the route of the cable, and generates pass points of the cable at the positions on the column or inside the rack away from the provisional point by at least the certain bend radius. This enables the route of the cable to be displayed in the three-dimensional space.

The certain bend radius is a value based on the minimum bend radius of the cable. A route of the cable may be configured under a condition in which the cable ca may be bent most out of the bend radius conditions of the cable ca with low probability of a failure such as breakage occurring. Accordingly, the rear face of the server may be suppressed from being blocked by the cable.

In addition, the information processing apparatus 100 generates a fourth point at a position on a route on which the cable may be disposed and away from the generated second provisional point by the minimum bend radius. When the product is a server, for example, the rear face of the server may accordingly be suppressed from being blocked by the cable. Thus, the works such as maintenance and construction of the server are facilitated.

The information processing apparatus 100 generates the fifth point at the position away from the generated second provisional point by the minimum bend radius on the axis in the lateral direction in the area. When the product is a server, for example, the rear face of the server may accordingly be suppressed from being blocked by the cable. Thus, the works such as maintenance and construction of the server are facilitated.

In addition, the information processing apparatus 100 does not perform generation processing of the fifth point if the distance between the sixth point generated at the position in the certain direction away from the position of the output connector by a certain length at the both ends of the cable, and the generated second provisional point is less than the certain bend radius. As a result, the pass point may be reduced and a route of the cable that more closely meets the bend radius condition may be created.

In addition, the information processing apparatus 100 generates a seventh point based on the positional relationship between the second point and the fourth point and deletes the second point and the fourth point when the positional relationship between the second point and the fourth point on the axis in the height direction is different from the positional relationship between the first product and the second product on the axis in the height direction. As a result, the pass point may be reduced and a route of the cable that more closely meets the bend radius condition may be created.

In addition, the information processing apparatus 100 generates a seventh point when the second point is lower than the fourth point in the height direction in a case in which the first product is higher than the second product in the height direction. In addition, the information processing apparatus 100 generates a seventh point when the fourth point is lower than the second point in the height direction in a case in which the first product is lower than the second product in the height direction. As a result, the pass point may be reduced, and a route of the cable that more closely meets the bend radius condition may be created.

The cable wiring method according to the present embodiment may be achieved by causing a computer such as a personal computer or a workstation to execute a cable wiring program that has been prepared in advance. The cable wiring program is recorded in a computer-readable recording medium such as a magnetic disk, an optical disk, a universal serial bus (USB), or a flash memory. In addition, the cable wiring program is executed by the computer reading out the cable wiring program from the recording medium. In addition, the cable wiring program may be distributed through a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory and computer-readable recording medium having stored therein a program to cause a computer to execute a simulation comprising:
   obtaining, from a memory, stored simulation information indicating coordinates in a coordinate system including three axes perpendicular to each other in a depth direction, a lateral direction and a height direction to define a three-dimensional simulation space of a simulated rack area including a plurality of rack columns parallel to an axis in the height direction, and including a first connector of a first product and a second connector of a second product provided in the simulated rack area;
   determining, based upon the stored simulation information, a wiring route of a cable to display the simulation of the wiring route of the cable in the simulated rack area by,
      generating a first provisional point at an intersection between a route, on which a cable to be wired from the first connector to the second connector is to be disposed and which is adjacent and parallel to one column of the plurality of columns parallel to the axis in the height direction, and a plane that includes a coordinate of the axis in the height direction of the first connector and that is parallel to a plane of an axis in the depth direction and an axis in the lateral direction,
      generating a first pass point at any position between a position away from the generated first provisional point by a length of a bend radius of the cable on the axis in the lateral direction in the simulated rack area and a position determined by a coordinate of the axis in the lateral direction of the first connector, and
      generating a second pass point at any position between a position away from the generated first provisional point by the length of a bend radius on the route on which the cable is to be disposed and a position determined by the coordinate of the axis in the height direction of the second connector on the route on which the cable is to be disposed,
         the first and second pass points being with respect to the first provisional point adjacent and parallel to the one column and the plane to thereby enable displaying the wiring route of the cable in the three-dimensional simulation space of the simulated rack; and
   storing, in the memory, the generated first and second pass points to display the wiring route of the cable through the first and second pass points in the simulated rack area.

2. The recording medium according to claim 1, wherein, the first pass point is generated at the position away from the generated first provisional point by the length of the bend radius of the cable on the axis in the lateral direction in the simulated rack area.

3. The recording medium according to claim 2, wherein the process further comprising:
   generating a third pass point at a position away from the position of the first connector in a direction by a length from an end of the cable, and
   deleting the first pass point when a distance between the generated third pass point and the generated first provisional point is less than the bend radius of the cable.

4. The recording medium according to claim 1, wherein, the second pass point is generated at the position away from the generated first provisional point by the length of the bend radius of the cable on the route on which the cable is to be disposed.

5. The recording medium according to claim 1, wherein the process further comprising:
   generating a second provisional point at an intersection between the route, on which the cable is to be disposed, and a plane that includes the coordinate of the axis in the height direction of the second connector and that is parallel to the plane of the axis in the depth direction and the axis in the lateral direction, and
   generating a fourth pass point at any position between a position away from the generated second provisional point by the length of the bend radius of the cable on the route on which the cable is to be disposed and a position determined by the coordinate of the axis in the height direction of the second connector on the route on which the cable is to be disposed, and
   generating a fifth pass point at any position between a position away from the generated second provisional point by the length of the bend radius of the cable on the axis in the lateral direction in the simulated rack area and a position determined by the coordinate of the axis in the lateral direction of the second connector.

6. The recording medium according to claim 5, wherein, the fourth pass point is generated at the position away from the generated second provisional point by the length of the bend radius of the cable on the route on which the cable is to be disposed.

7. The recording medium according to claim 5, wherein, the fifth pass point is generated at the position away from the generated second provisional point by the length of the bend radius of the cable on the axis in the lateral direction in the simulated rack area.

8. The recording medium according to claim 7, wherein the process further comprises:
   generating a sixth pass point at a position away from the position of the second connector in a direction by a length from an end of the cable, and
   deleting the fifth pass point when a distance between the generated sixth pass point and the generated second provisional point is less than the length of the bend radius of the cable.

9. The recording medium according to claim 5, wherein the second pass point is at the position away from the generated first provisional point by the length of the bend radius of the cable on the route on which the cable is to be disposed, and
   the fourth pass point is at the position away from the generated second provisional point by the length of the bend radius of the cable on the route on which the cable is to be disposed, and
   the processing further comprises
      generating a seventh pass point based on a positional relationship between the second pass point and the fourth pass point and deleting the second pass point and the fourth pass point when a distance between the second pass point and the fourth pass point on the axis in the height direction is short compared to twice the bend radius.

10. The recording medium according to claim 1, wherein the length of the bend radius of the cable is a value based on a minimum bend radius of the cable.

11. A method by a computer, the method comprising:
obtaining, from a memory, stored simulation information indicating coordinates in a coordinate system including three axes perpendicular to each other in a depth direction, a lateral direction and a height direction to define a three-dimensional simulation space of a simulated rack area including a plurality of rack columns parallel to an axis in the height direction, and including a first connector of a first product and a second connector of a second product provided in the simulated rack area;
determining, based upon the stored simulation information, a wiring route of a cable to display a simulation of the wiring route of the cable in the simulated rack area by,
generating a first provisional point at an intersection between a route, on which a cable to be wired from the first connector to the second connector is to be disposed and which is adjacent and parallel to one column of the plurality of columns parallel to the axis in the height direction, and a plane that includes a coordinate of the axis in the height direction of the first connector and that is parallel to a plane of an axis in the depth direction and an axis in the lateral direction,
generating a first pass point at any position between a position away from the generated first provisional point by the length of a bend radius of the cable on the axis in the lateral direction in the simulated rack area and a position determined by a coordinate of the axis in the lateral direction of the first connector, and
generating a second pass point at any position between a position away from the generated first provisional point by the length of a bend radius on the route on which the cable is to be disposed and a position determined by the coordinate of the axis in the height direction of the second connector on the route on which the cable is to be disposed,
the first and second pass points being with respect to the first provisional point adjacent and parallel to the one column and the plane to thereby enable displaying the wiring route of the cable in the three-dimensional simulation space of the simulated rack; and
storing, in the memory, the generated first and second pass points to display the wiring route of the cable through the first and second pass points in the simulated rack area.

12. An information processing apparatus comprising:
a memory, and
a processor to couple to the memory and configured to,
obtain, from the memory, stored simulation information indicating coordinates in a coordinate system including three axes perpendicular to each other in a depth direction, a lateral direction and a height direction to define a three-dimensional simulation space of a simulated rack area including a plurality of rack columns parallel to an axis in the height direction, and including a first connector of a first product and a second connector of a second product provided in the simulated rack area,
determine, based upon the stored simulation information, a wiring route of a cable to display a simulation of the wiring route of the cable in the simulated rack area by,
generating a first provisional point at an intersection between a route, on which a cable to be wired from the first connector to the second connector is to be disposed and which is adjacent and parallel to one column of the plurality of columns parallel to the axis in the height direction, and a plane that includes a coordinate of the axis in the height direction of the first connector and that is parallel to a plane of an axis in the depth direction and an axis in the lateral direction,
generating a first pass point at any position between a position away from the generated first provisional point by a length of a bend radius of the cable on the axis in the lateral direction in the simulated rack area and a position determined by a coordinate of the axis in the lateral direction of the first connector, and
generating a second pass point at any position between a position away from the generated first provisional point by the length of a bend radius on the route on which the cable is to be disposed and a position determined by the coordinate of the axis in the height direction of the second connector on the route on which the cable is to be disposed,
the first and second pass points being with respect to the first provisional point adjacent and parallel to the one column and the plane to thereby enable displaying the wiring route of the cable in the three-dimensional simulation space of the simulated rack; and
store, in the memory, the generated first and second pass points to display the wiring route of the cable through the first and second pass points in the simulated rack area.

* * * * *